United States Patent
Komoda et al.

(10) Patent No.: US 6,300,705 B1
(45) Date of Patent: Oct. 9, 2001

(54) ULTRASONIC MOTOR DRIVEN BY ELLIPTIC VIBRATION

(75) Inventors: Masahiko Komoda, Toyokawa; Atsushi Tariki, Hamamatsu, both of (JP)

(73) Assignee: Asmo Co., Ltd., Kosai (JP)

(*) Notice: Subject to any disclaimer, the term of this patent is extended or adjusted under 35 U.S.C. 154(b) by 0 days.

(21) Appl. No.: 09/360,299

(22) Filed: Jul. 22, 1999

(30) Foreign Application Priority Data

Jul. 29, 1998 (JP) ................................................. 10-214097
Jul. 30, 1998 (JP) ................................................. 10-214978
Aug. 19, 1998 (JP) ................................................. 10-232843

(51) Int. Cl.$^7$ .................................................. M01L 41/08
(52) U.S. Cl. ............................... 310/323.12; 310/323.02
(58) Field of Search ..................... 310/323.02, 323.12, 310/323.15, 323.16, 325

(56) References Cited

U.S. PATENT DOCUMENTS

| 4,703,214 | * | 10/1987 | Mishiro | 310/323.02 |
| 5,376,858 | * | 12/1994 | Imabayashi et al. | 310/323.02 |
| 5,416,375 | * | 5/1995 | Funakubo et al. | 310/323.12 |
| 5,825,118 | * | 10/1998 | Okazaki | 310/323.12 |
| 6,018,213 | * | 1/2000 | Yano | 310/323.12 |

FOREIGN PATENT DOCUMENTS

| A-7-184380 | 7/1995 | (JP) . |
| A-7-75353 | 8/1995 | (JP) . |
| A-9-182469 | 7/1997 | (JP) . |

* cited by examiner

Primary Examiner—Mark O. Budd
(74) Attorney, Agent, or Firm—Fish & Richardson P.C.

(57) ABSTRACT

An ultrasonic motor composed of a cylindrical stator having a vibration converting member and a cylindrical rotor slidably rotatable on the stator. Ultrasonic longitudinal vibration is generated in the stator by imposing high frequency voltage on piezoelectric elements disposed in the stator. A part of the longitudinal vibration is converted into twisting vibration by operation of slits formed on the vibration converting member. Both the longitudinal and twisting vibrations are compounded into elliptic vibration which drives the rotor. The vibration converting member is made by laminating a number of element plates each having cut-out portions or by combining several divided blocks. The slits are automatically formed on the vibration converting member without being machined, when the vibration converting member is formed by assembling the element plates or the divided blocks.

26 Claims, 27 Drawing Sheets

ULTRASONIC MOTOR DRIVEN BY ELLIPTIC VIBRATION

CROSS-REFERENCE TO RELATED APPLICATIONS

This application is based upon and claims benefit of priority of Japanese Patent Applications No. Hei-10-214097 filed on Jul. 29, 1998, No. Hei-10-214978 filed on Jul. 30, 1998 and No. Hei-10-232843 filed on Aug. 19, 1998, the contents of which are incorporated herein by reference.

BACKGROUND OF THE INVENTION

1. Field of the Invention

The present invention relates to an ultrasonic motor that is driven by elliptic vibration formed by combining longitudinal and twisting vibrations, and more particularly to an improved motor structure for converting the longitudinal vibration to the twisting vibration, or vice versa.

2. Description of Related Art

A standing-wave-type ultrasonic motor driven by elliptic vibration that is a compound of longitudinal and twisting vibrations is known. An example of this kind of motor is shown in FIG. 29. The ultrasonic motor is composed of a stator 500 and a rotor 504. The stator 500 includes a pair of metallic blocks 502 and 503, between which a pair of piezoelectric elements 501 is interposed, constituting a Langevin-type vibrator. The metallic blocks 502, 503 and the piezoelectric elements 501 are fastened together, thereby forming the stator 500. The rotor 504 is mounted on the stator 500 by a through-bolt so that the rotor 504 silidably rotates on the upper surface of the stator 500. Longitudinal vibration is generated by the piezoelectric elements, and a part thereof is converted into twisting vibration by slits 505 formed on the metallic block 503. The longitudinal and the converted twisting vibrations are combined into elliptic vibration which appears on the upper surface of the metallic block 502. The rotor 504 is driven by the elliptic vibration. The slits 505 are formed on the outer periphery of the metallic block 503 by machining with a certain depth. Conventionally, the slits 505 are machined with an end mill, a metal saw or the like. However, such machining is not easy, and it is expensive to machine all the slits on the outer periphery of the metallic block.

SUMMARY OF THE INVENTION

The present invention has been made in view of the above-mentioned problem, and an object of the present invention is to provide an improved structure for converting the longitudinal vibration into the twisting vibration, or vice versa, and more particularly to provide a vibration converting member having plural slits which are formed without being machined. Another object of the present invention is to provide a method of manufacturing such vibration converting member.

The ultrasonic motor is composed of a stator and a rotor that slidably rotates on the stator. The ultrasonic motor is generally cylinder-shaped. The stator includes a vibration generating member in which ultrasonic longitudinal vibration is generated by piezoelectric elements and a vibration converting member that converts a part of the longitudinal vibration into twisting vibration. The vibration converting member has slits formed thereon by which the longitudinal vibration is converted into the twisting vibration. Both of the longitudinal and twisting vibrations are compounded into elliptic vibration in the stator, and the rotor is driven by the elliptic vibration.

The vibration converting member is formed by laminating a number of element plates each including cut-out portions to form the slits when laminated. Accordingly, the slits are easily formed on the vibration converting member without using a machining process. The element plates may be connected to one another by bonding their outer periphery with a bonding material such as solder or adhesive, or by covering the laminated block with molding resin or plating metal. Also, the element plates may be connected by press-fitting projections into holes formed on each element plate, or by a holding case that contains the laminated element plates therein. Preferably, the slits are slanted relative to the axis of the stator to enhance the efficiency for converting the longitudinal vibration into the twisting vibration. The slits may be open to the outer periphery or the center hole of the vibration converting member.

Alternatively, the vibration converting member is formed by combining several divided blocks made by die-casting, forging, sintering or the like. The slits are formed between the divided blocks when they are combined. The divided blocks are combined with one another by adhesive, for example.

The vibration converting member may be included in the rotor to form the compound elliptic vibration therein, or it may be formed in both of the rotor and stator to further enhance the conversion efficiency. The twisting vibration may be generated in the stator in place of the longitudinal vibration, and a part of the twisting vibration is converted into the longitudinal vibration to form the elliptic vibration.

Since the vibration converting member is made, according to the present invention, by laminating the element plates having cut-out portions or by combining the divided blocks, the slits are easily formed on the vibration converting member without using a machining process.

Other objects and features of the present invention will become more readily apparent from a better understanding of the preferred embodiments described below with reference to the following drawings.

Figure 1:
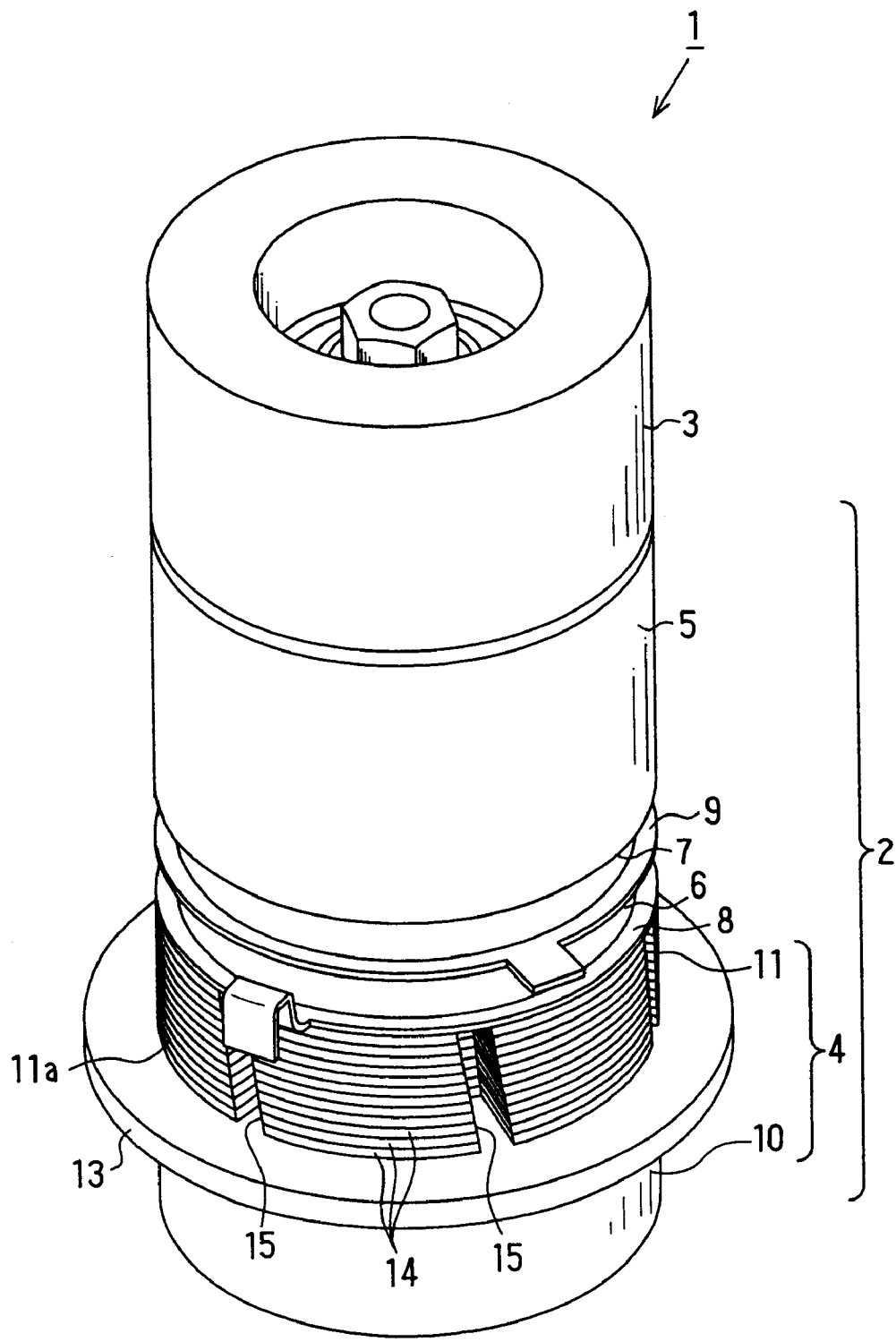
FIG. 1 is a perspective view showing an ultrasonic motor as a first embodiment of the present invention.

DETAILED DESCRIPTION OF THE PREFERRED EMBODIMENTS (First Embodiment)

A first embodiment of the present invention will be described with reference to FIGS. 1–9. First, referring to FIGS. 1–3, an ultrasonic motor 1 is composed of a stator 2 and a rotor 3 which is slidably rotatable on the upper surface of the stator 2. The stator 2 is composed of a first block 4, a vibrator element portion and a second block 5. The vibrator element portion includes a first electrode plate 8, a first piezoelectric element 6, a second electrode plate 9 and a second piezoelectric element 7, all of these components being stacked together in this order from the bottom. The vibration element portion is sandwiched between the first block 4 and the second block 5.

The first block 4 is substantially cylinder-shaped and includes a lower block 10 and an upper block 11. The lower bolck 10 is made of a conductive material such as an aluminum alloy, and has a flange 13 and a center hole 12 as better seen in FIG. 2. The upper block 11 is formed by laminating a number of element plates 14 made of a conductive material such as an aluminum alloy. Each element plate 14 is punched by press-work into a shape shown in FIG. 2, and laminated and bonded to one another by adhesive. The element plate 14 has a center hole 16 and a plurality of cut-out portions 17 formed at its outer periphery 14a. The cut-out portions 17 extend in the radial direction and open to the outer periphery 14a. The element plates 14 are laminated so that slits 15 are formed with an angle slanted relative to the center axis of the upper block 11. The slanted slits 15 serve to convert a part of longitudinal vibration in the upper block 11 into twisted vibration.

On the top of the first block 4, the first electrode plate 8, the first piezoelectric element 6, the second electrode plate 9, the second piezoelectric element 7 and the second block 5 are stacked in this order. The first piezoelectric element 6 made of a piezoelectric material is disc-shaped and has a center hole 18. The first piezoelectric element 6 is polarized so that it generates longitudinal vibration in its axial direction when energized with high frequency voltage. The first electrode plate 8 is disc-shaped, and has a center hole 19 having the same diameter as the center hole 18 and a terminal 20 formed at its periphery. Similarly, the second piezoelectric element 7 is disc-shaped and has a center hole 21 of the same diameter as the center hole 18. The piezoelectric element 7 is also polarized so that it generates longitudinal vibration in its axial direction but 180-degree opposite to the longitudinal vibration of the first piezoelectric element 6. The second electrode plate 9 is disc-shaped, and has a center hole 22 and a terminal 23 formed at its periphery.

Figure 3:
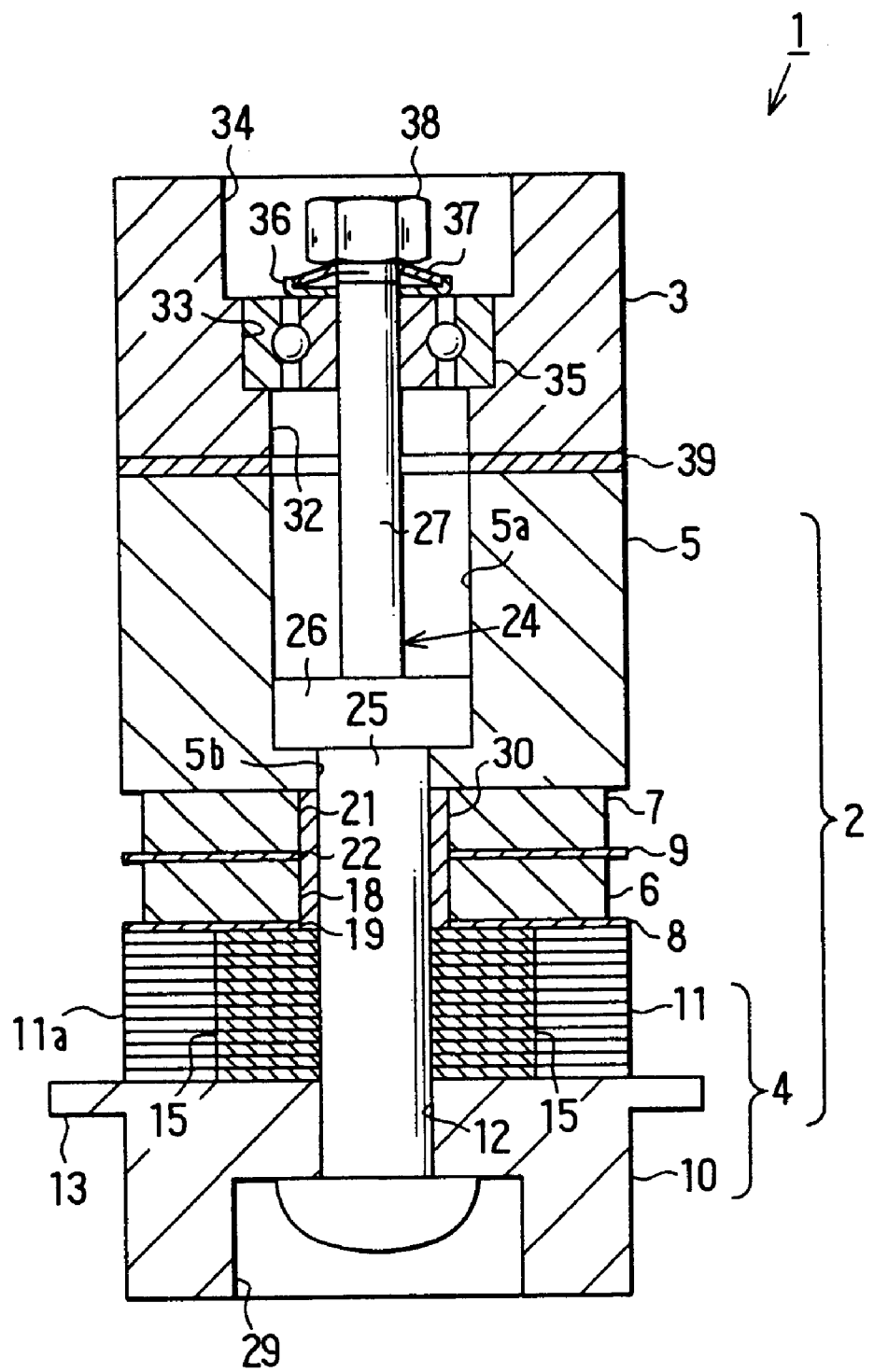
FIG. 3 is a cross-sectional view showing the ultrasonic motor shown in FIG, 1.

The second block 5 is made of a conductive material such as an aluminum alloy and cylinder-shaped. The second block 5 has a center bore 5a and a bottom bore 5b. All the diameters of the bottom bore 5b, the center hole 12 of the lower block 10 and the center hole 16 of the element plates 14 are made in the same size. An insulating bushing 30 is inserted into the respective center holes 19, 18, 22 and 21 of the vibrator element portion, as shown in FIG. 3. The inner diameter of the insulating bushing 30 is the same as those of the bottom bore 5b and the center holes 16, 12.

Figure 2:
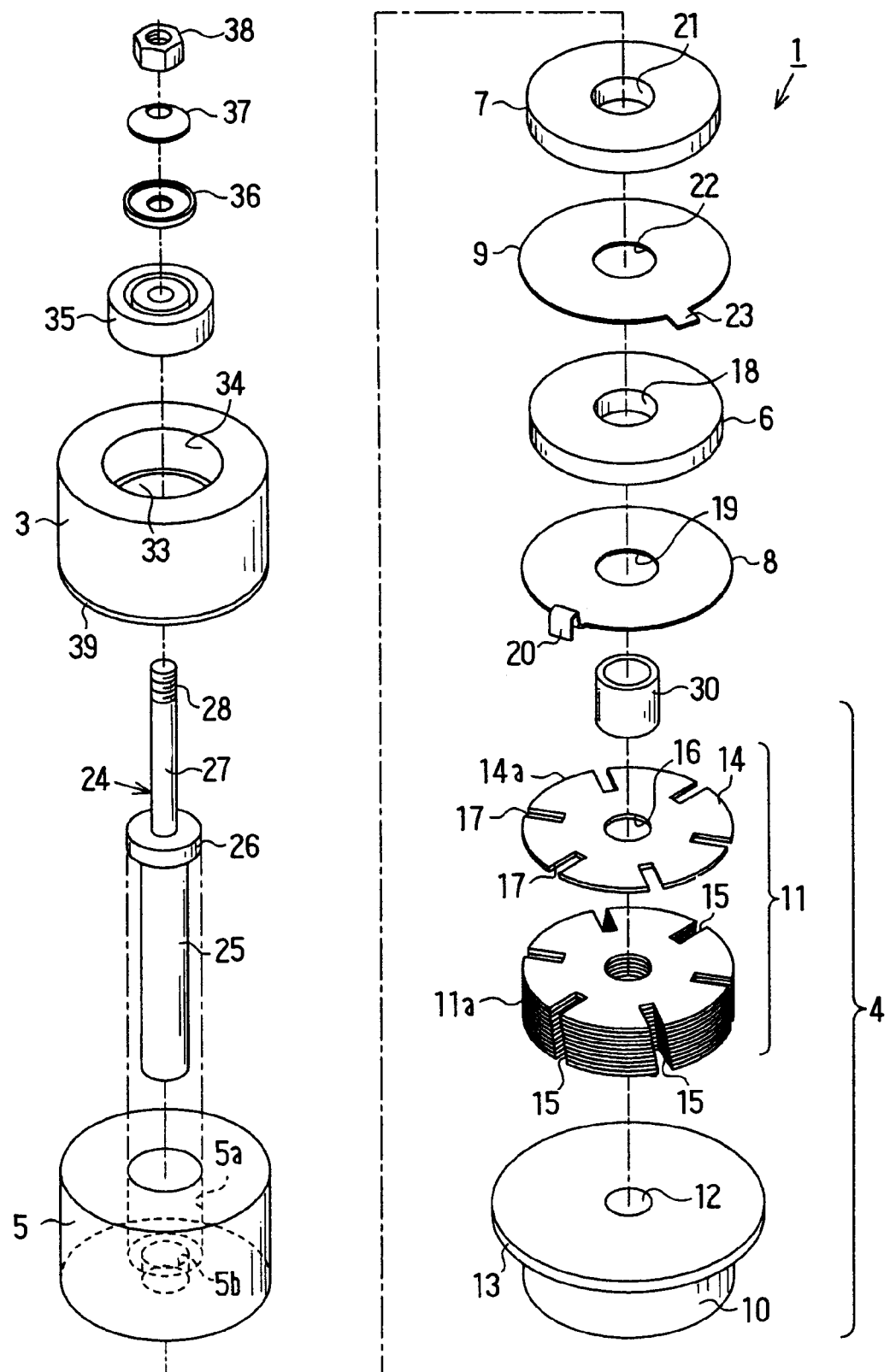
FIG. 2 is an exploded view showing parts and components used in the ultrasonic motor shown in FIF. 1.

FIG. 3 shows a cross-section of the assembled ultrasonic motor 1. The first block 4, the vibrator element portion 8, 6, 9, 7, and the first block 5 are all connected together by a fastening bolt 24, forming the stator 2. As shown in FIG. 2, the fastening bolt 24 includes four portions, a male screw 28, a rod 27, a flange 26 and a larger rod 25 made in this order from the top. In assembling the rotor 2, the larger rod 25 is inserted from the top of the second block 5 through the second block 5, the insulating bushing 30, the upper block 11 and the lower block 10 until its flange 26 abuts the bottom of the center bore 5a. The bottom tip of the larger rod 25 sticks out into a depressed space 29 of the lower block 10. Then, the bottom tip of the larger rod 25 is smashed and caulked, thereby fastening all the components of the rotor 2 into one piece, as shown in FIG. 3.

The rotor 3 is slidably assembled on the upper surface of the second block 3. The rotor 3 is made of a metallic material such as stainless steel and cylinder-shaped. In the center of the rotor 3, a through-hole 32, a bearing hole 33 and a depressed space 34 are formed in this order from the bottom. The diameter of the depressed space 34 is the largest, and that of the through-hole 32 is the smallest. A bearing 35 is supported in the bearing hole 33. The rod 27 of the fastening bolt 24 is inserted into the inner bore of the bearing 35, and the male screw 28 extends into the depressed space 34. The rotor 3 is assembled on the stator 2 by fastening a nut 38 to the male screw 28. A spring receiver 36 is placed on the bearing 35 and disc spring 37 is interposed between the spring receiver 36 and the nut 38 to prevent the nut 38 from being loosened. A lining 39 is attached to the bottom surface of the rotor 3 with adhesive, and the rotor 3 is slidably rotates on the stator 2.

Both of the first and second piezoelectric elements 6 and 7 are energized by imposing high frequency voltage between the first electrode plate 8 and the second electrode plate 9. The first piezoelectric element 6 is sandwiched between both electrode plates 8 and 9, and the second piezoelectric element 7 is disposed between the second electrode plate 9 and the second block 5 to which the first electrode plate 8 is electrically connected through the first block 4 and the fastening bolt 24.

Operation of the ultrasonic motor 1 structured as above will be explained. Upon imposition of high frequency voltage on both electrode plates 8, 9, the first and second piezoelectric elements 6, 7 generate the longitudinal vibration in the same mode because both elements 6, 7 are polarized in opposite directions. That is, when the first element 6 expands, the second element 7 also expands. When the first element 6 shrinks, the second element 7 also shrinks. Therefore, the amplitude of the longitudinal vibration is doubled. Such longitudinal vibration is transferred to the first and second blocks 4 and 5. A part of the longitudinal vibration in the first block 4 is efficiently converted into the twisting vibration by operation of the slits 15 formed on the upper block 11. This twisting vibration is also transferred to the first block 5, where the longitudinal vibration and the twisting vibration are compounded into the elliptic vibration. The rotor 3 is driven in one rotational direction by the elliptic vibration. In this embodiment, the stator 2 functions as a vibration generating member and a vibration converting member.

Advantages in the first embodiment are summarized as follows. Since the upper block 11 is formed by laminating plural stamped sheets, the slits 15 for converting the longitudinal vibration into the twisting vibration are easily formed without machining work. Since the stator 2 is structured to directly convert the longitudinal vibration generated therein into the twisting vibration, a high conversion efficiency is obtained. Since a pair of piezoelectric elements 6, 7 are sandwiched between the first and second blocks 4, 5, the amplitude of vibration is doubled, and the motor efficiency is enhanced. Since the slits 15 are slanted, a high conversion efficiency is attained.

Figure 4:
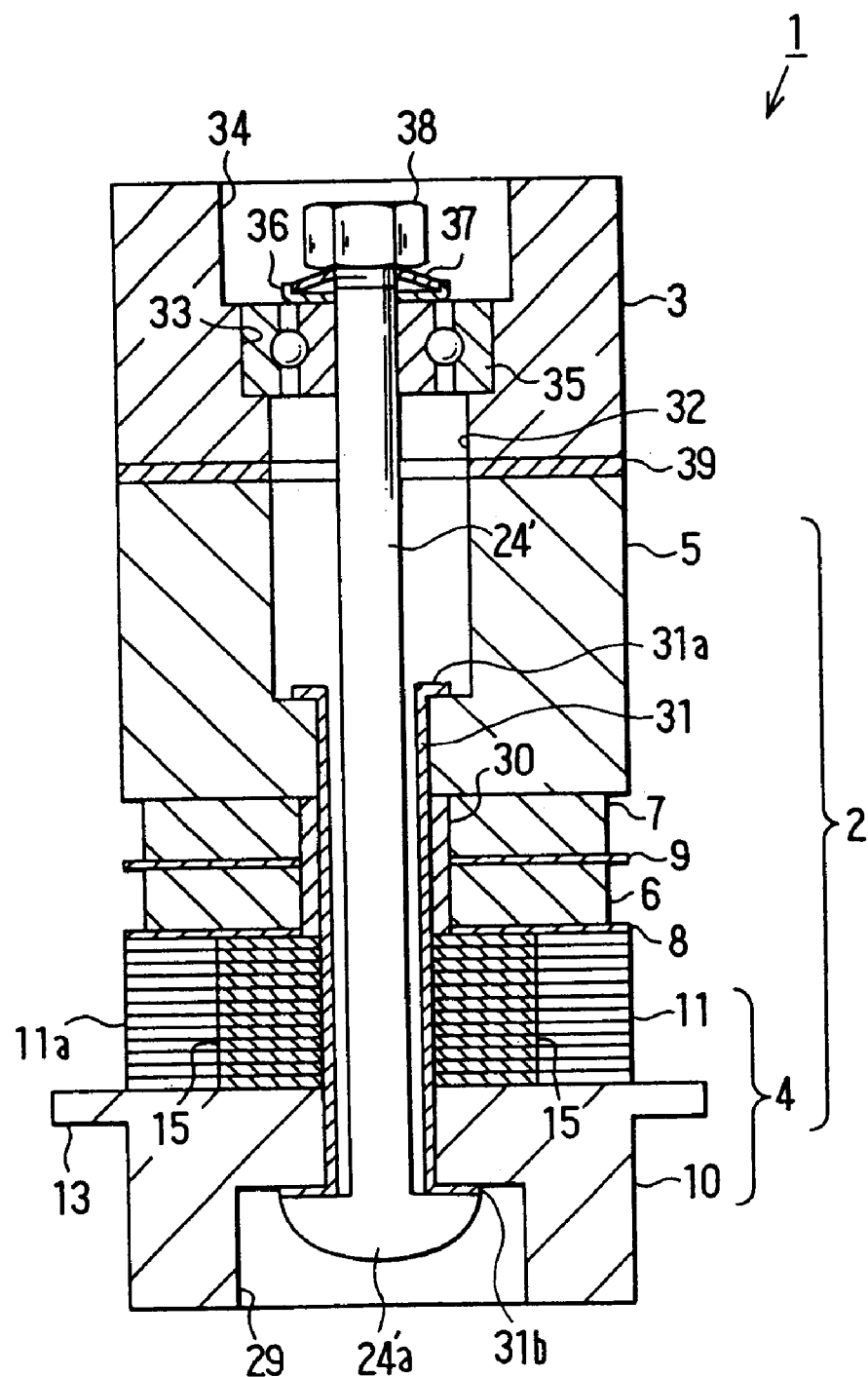
FIG. 4 is a cross-sectional view showing an ultrasonic motor in which a stator fastening structure is modified from that of the ultrasonic motor shown in FIG. 1.

The structure for fastening components of the stator 2 shown in FIG. 3 may be modified in the form shown in FIG. 4. The fastening bolt 24 is modified to a fastening bolt 24' which is a straight rod and only has an enlarged head 24' a that stops its axial movement in the depressed space 29 of the lower block 10. The stator components, namely, the first block 4, the vibration element portion 8, 6, 9, 7, and the second block 5, are all fastened together by a sleeve 31. The upper end 31a of the sleeve 31 is widened on the bottom surface of the center bore 5a, and the bottom end 31b is also widened on the upper surface of the depressed space 29, thereby fastening all the rotor components together. The fastening bolt 24' only connects the assembled stator 2 and the rotor 3.

Figure 5A:
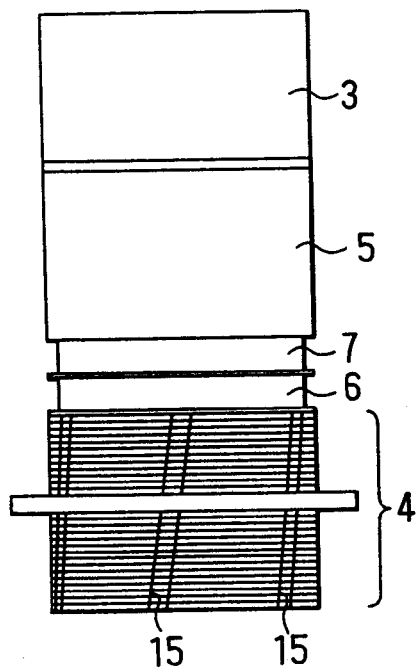
FIGS. 5A–5G are schematic views showing variously modified forms of an ultrasonic motor, a vibration converting member being variously located and arranged.

The vibration converting member having slanted slits formed by laminating element plates may be placed at various positions in the ultrasonic motor. Some examples are shown in FIGS. 5A–5G. In FIG. 5A, the whole first block 4 including the upper and lower blocks 11, 10 is formed by laminating element plates, and the slanted slits 15 are provided on the first block 4. In this structure, the first block 4 functions as the vibration converting member.

Figure 5B:
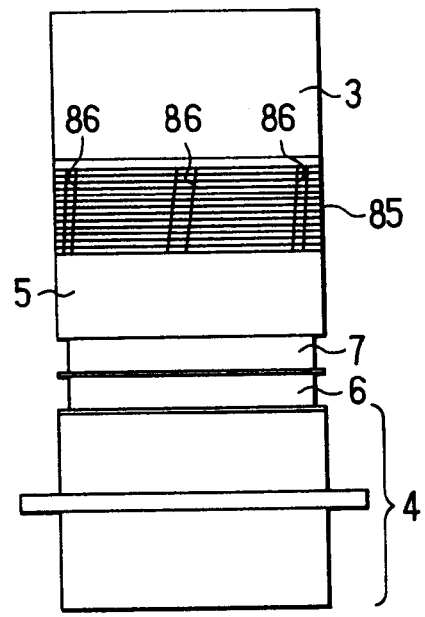

In an example shown in FIGS. 5B, an upper part of the second block 5 is made by laminating element plates having slits 86 for converting the vibration. In this structure, an upper part of the second block 85 functions as the vibration converting member.

Figure 5C:
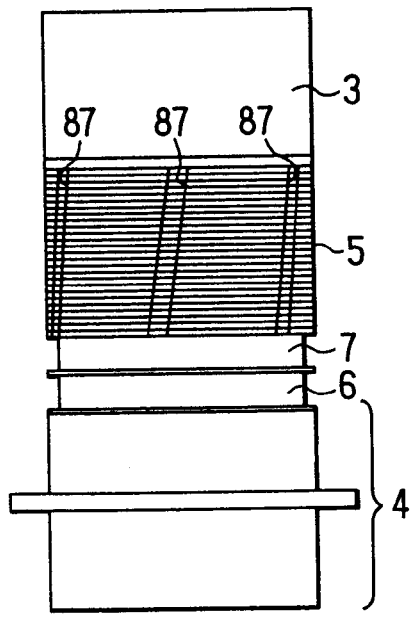
Figure 5D:
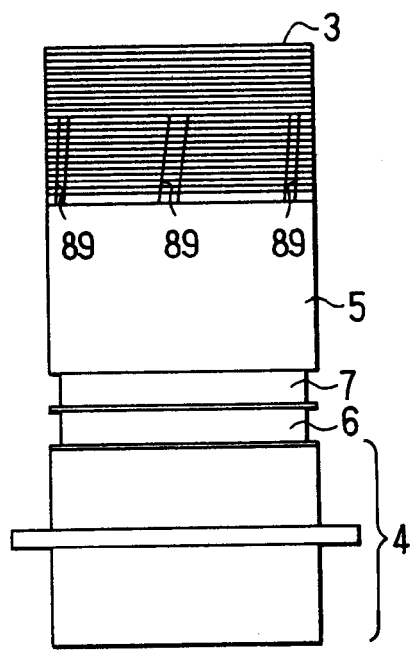
Figure 5E:
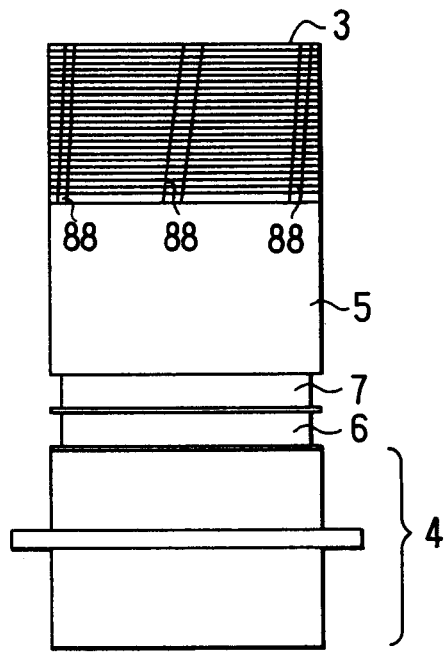

In an example shown in FIG. 5C, the second block 5 as a whole is formed by laminating the element plates having slits 87. In this structure, the second block 5 as a whole functions as the vibration converting member. In the structure shown in FIG. 5D, the rotor 3 is formed by laminating element plates, and slits 89 are formed on the lower part of the rotor 5. In FIG. 5E, slits 88 are formed on the whole outer periphery of the rotor 3. In the structures shown in FIGS. 5D and 5E, the rotor 3 having slits functions as the vibration converting member in addition to its primary function as a rotor.

Figure 5F:
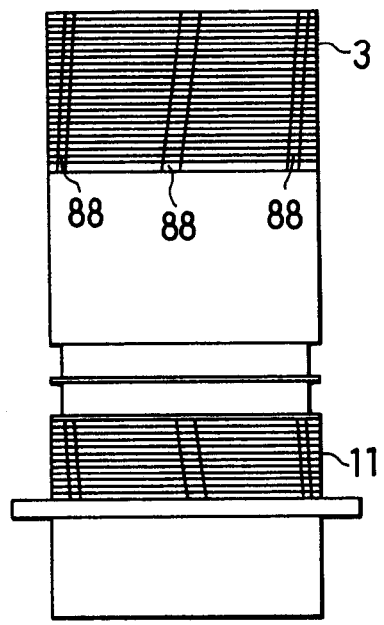
Figure 5G:
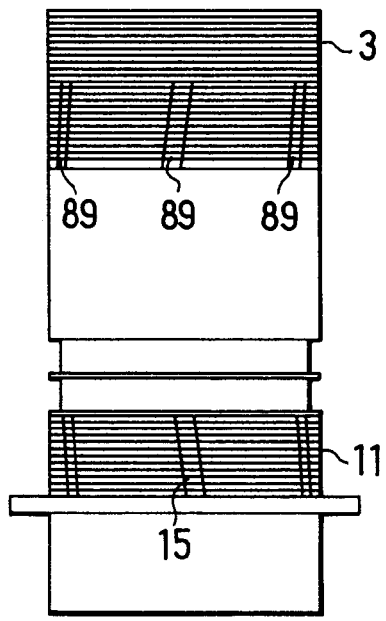

In examples shown in FIGS. 5F and 5G, both of the upper block 11 and the rotor 3 are made by laminating element plates. In FIG. 5F, the slits 88 are formed on the rotor 3 throughout its whole axial length. In FIG. 5G, the slits 89 are formed only on the lower part of the rotor 3. The slanting direction of both slits formed on the rotor and the stator may be opposite to each other as in the examples shown in FIGS. 5F and 5G.

Figure 6:
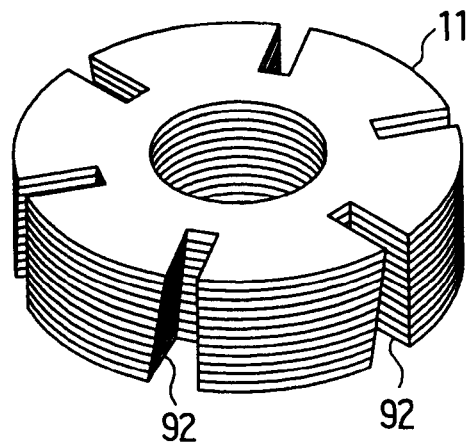
FIG. 6 is a perspective view showing a vibration converting member having modified form of slits.
Figure 7A:
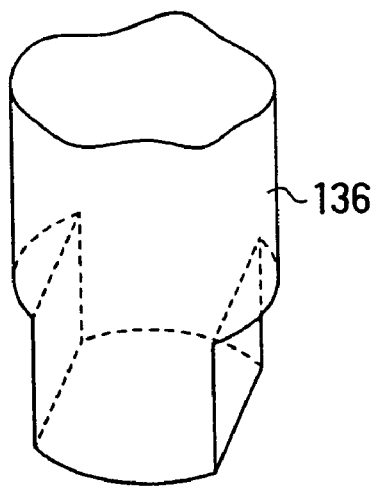
FIG. 7A is a perspective view showing an output shaft of an ultrasonic motor.
Figure 7B:
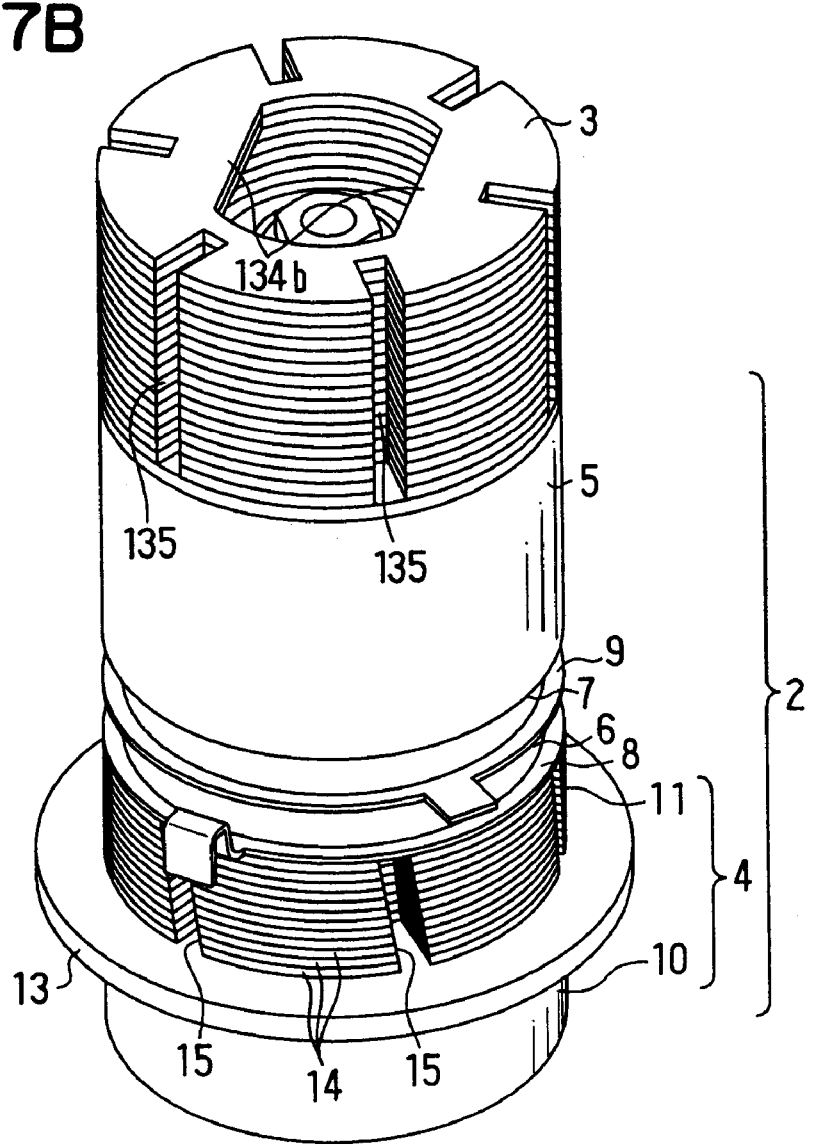
FIG. 7B is a perspective view showing an ultrasonic motor that includes a coupling hole to be connected to the output shaft shown in FIG. 7A.

The form of the slit 15 shown in the foregoing drawings may be variously modified. The width of the slit may not be uniform throughout its length, and it may not be slanted relative to the axis of the stator or the rotor. One example of its modification is shown in FIG. 6. The width of a slit 92 is not uniform in its length. Its upper width is narrower and gradually enlarged toward its bottom end, and its one side is parallel to the axis while the other side is slanted. Further, the number of the slits may be variously selected according to design needs.

Figure 8:
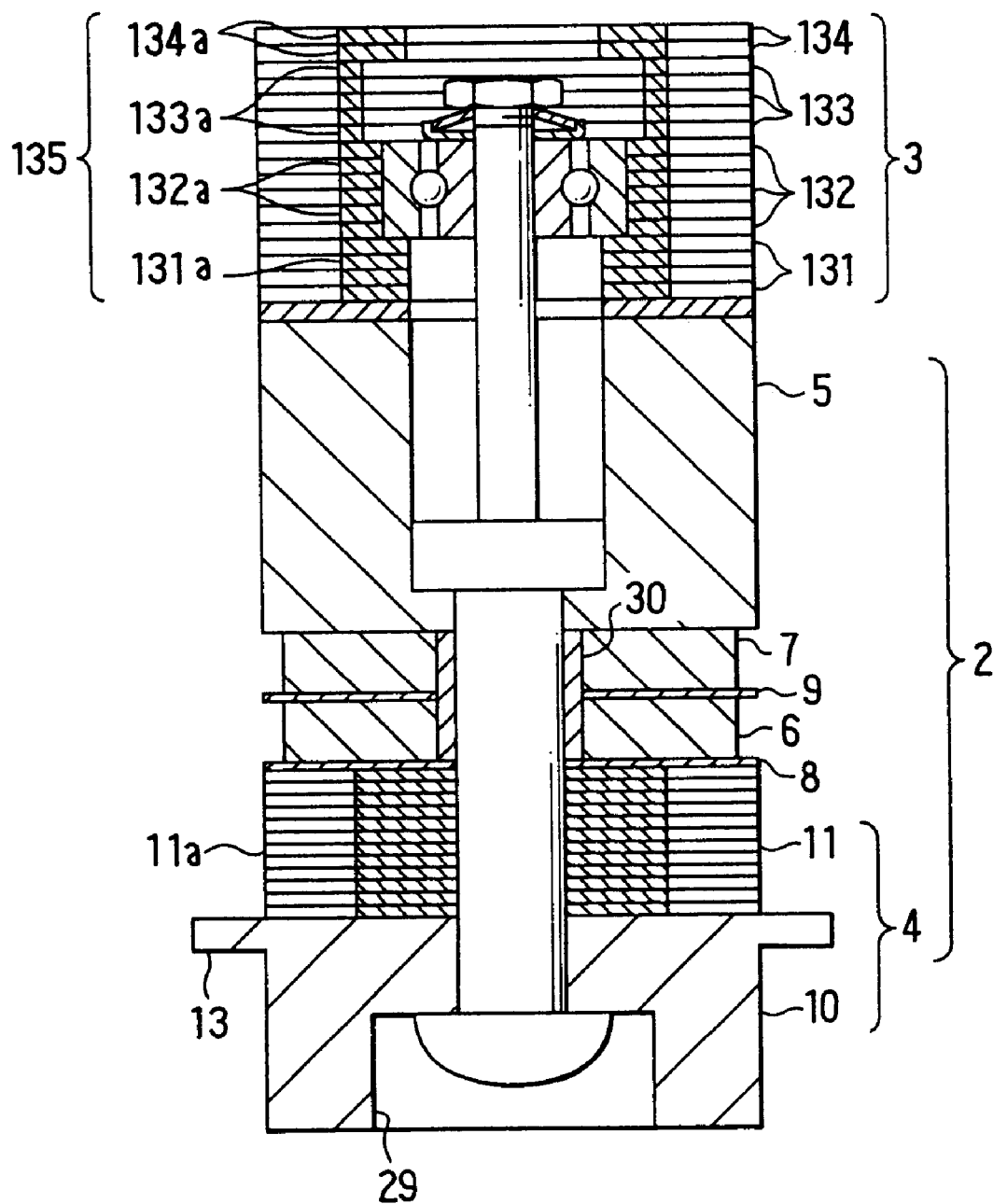
FIG. 8 is a cross-sectional view showing the ultrasonic motor shown in FIG. 7B.
Figure 9:
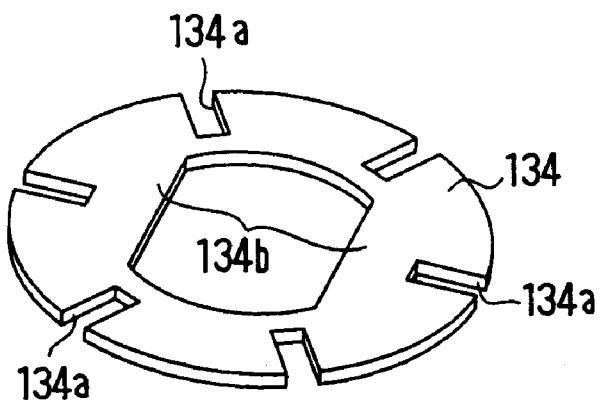
FIG. 9 is a perspective view showing an upper element plate used in a rotor of the ultrasonic motor shown in FIG. 7B.

Referring to FIGS. 7A, 7B, 8 and 9, a modified form of the rotor 3 will be described. The rotor 3 is formed by laminating different kinds of element plates 131–134, and a coupling hole 134b for receiving an output shaft 136 therein is formed in the upper portion of the rotor 3. The rotational torque of the ultrasonic motor is taken out through the coupling shaft 136. As shown in FIG. 8, four kinds of element plates 131–134 having respective cut-out portions 131a–134a are laminated and bonded together. The shape of the center openings of the respective element plates 131–134 are differently formed, so that the bearing 35 is properly received therein and the rotor 3 is slidably coupled to the stator 2 by the fastening bolt 24 in the same manner as in the motor shown in FIG. 3. The cut-out portions 131a–134a of the element plates form slits 135 when they are laminated. As shown in FIG. 9, the element plate 134 forming the upper portion of the rotor 3 has a center opening that forms the coupling hole 134b when laminated. The rotor 3 structured as above also serves as the vibration converting member. In the particular ultrasonic motor shown in FIG. 7B, both of the upper block 11 and the rotor 3 serve as the vibration converting member, thereby the conversion efficiency being enhanced.

Figure 10:
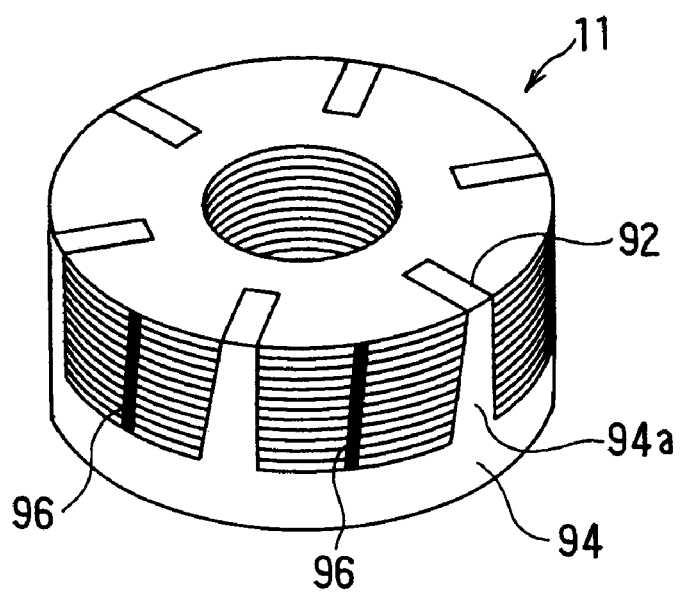
FIG. 10 is a perspective view showing a method of laminating element plates to form an upper block.

Referring to FIGS. 10–13, various structures for bonding the element plates to form the upper block 11 will be described. One example is shown in FIG. 10, in which the outer periphery of the laminated upper block 11 is bonded by adhesive, metallic solder or caulking at several positions between the slits. Though the upper block 11 shown here as an example has the same shape as the one shown in FIG. 6, but it can be differently shaped. A jig 94 with pillars 94a having a complementary shape to the slit 92 is prepared. Element plates are stacked on the jig 94 so that the pillars 94a fit into the slits 92 as shown in FIG. 10. Then, a bonding material 96 such as adhesive resin or metallic solder is coated along vertical lines between the slits 92. After the bonding material is cured, the jig 94 is separated from the upper block 11. Thus, the laminated element plates are all bonded together, completing the upper block 11. The element plates may also be bonded together by caulking. The outer periphery of the upper block 11 is cut by a sharp edge to form a shallow notch along each vertical line between the slits. Each element plate is connected to one another by small edges associatedly formed with the notch. No additional bonding material is needed in the caulking process.

Figure 11A:
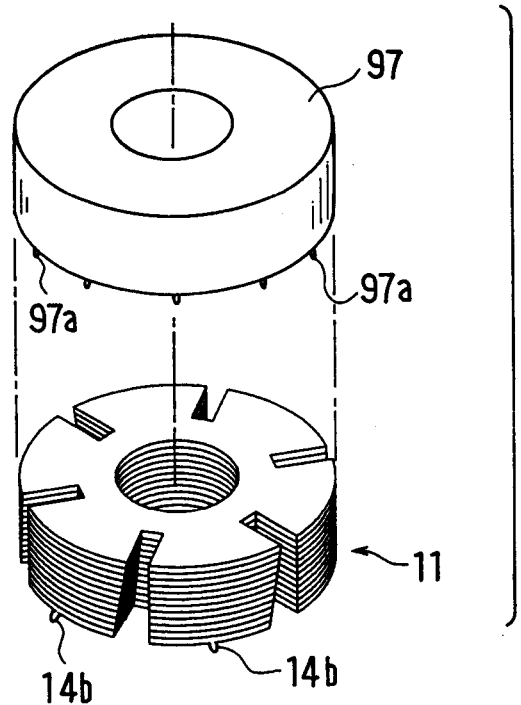
FIGS. 11A–11C are drawings showing a method of forming an upper block by containing element plates in a holding case.
Figure 11B:
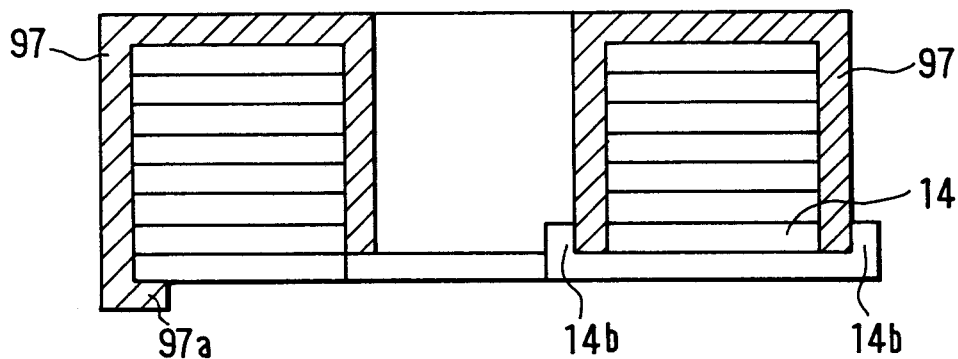
Figure 11C:
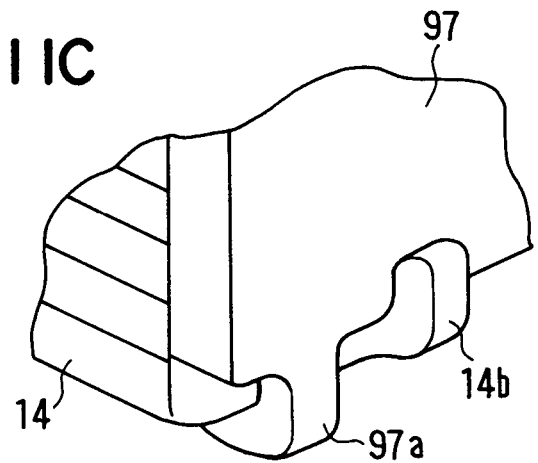

FIGS. 11A, 11B and 11C show another structure for connecting element plates to form the upper block 11. A case 97 for holding laminated element plates therein is prepared. The case 97 is double-cylinder-shaped and has a number of claws 97a formed on its bottom edge. The bottom-most element plate 14 of the laminated upper block 11 has several claws 14b formed between the cut-out portions. The laminated upper block 11 is press-fitted into the case 97, as shown in FIG. 11A. Then, the block 11 is firmly held in the case 97 by caulking both claws 97a and 14b as shown in FIG. 11B. Details of the caulked claws 97a and 14b are shown in FIG. 11C. The upper surface of the case 97 may be used as a surface contacting the rotor 3, when the case 97 is used for holding the laminated second block 5. Similarly, it may be used as a surface contacting the second block 5, when the case 97 is used for holding the laminated rotor 3.

Figure 12A:
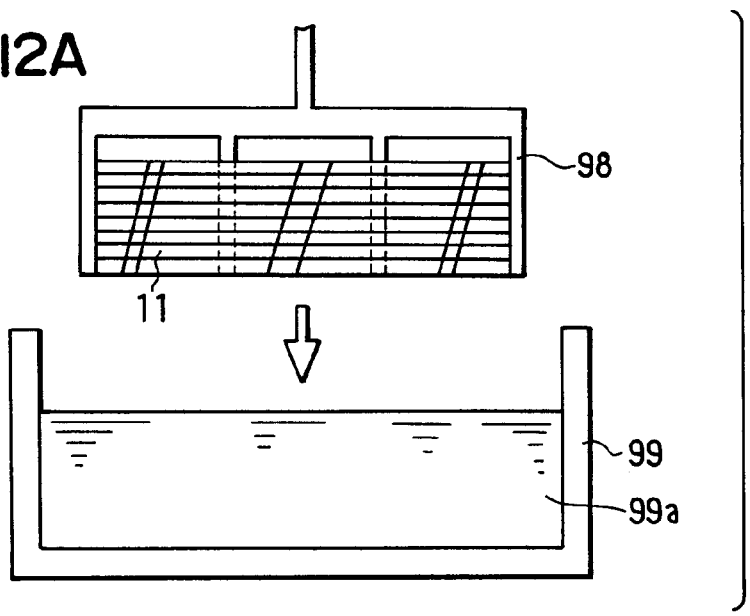
FIGS. 12A–12B are drawings showing a method of covering an outer periphery of the upper block with molding resin.
Figure 12B:
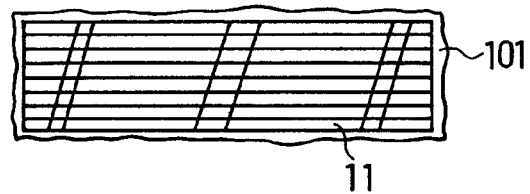

Another method for bonding the element plates is molding. As shown in FIG. 12A, a vessel 99 containing molding resin 99a is prepared, and the upper block 11 is held in a hanger arm 98. The upper block 11 is dipped in the molding resin 99a for a certain period. Then, the block 11 is lifted up from the molding resin 99a. The block 11 is completely covered with the molding resin 99a, and the molding resin 99a is cured. Thus, the element plates are bonded together by the cured molding resin 101 as shown in FIG. 12B. The surfaces of the cured resin 101 are smoothed by a grinder. If the smoothed surface of the molding resin is used as the contacting surface, the lining 39 may be eliminated. The molding may be replaced by metal plating. The metal plating is performed in the similar method as the molding. All the surfaces of the block 11 are covered with plated metal, and element plates are bonded together. The metal-plated surface is also suitable as the contacting surface.

Figure 13:
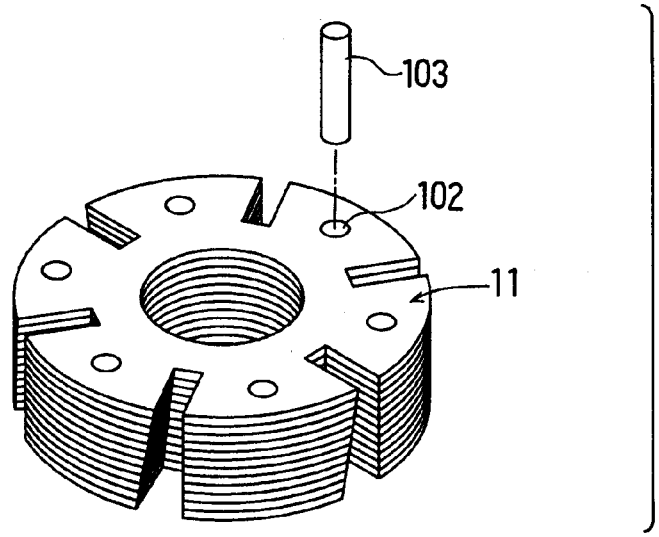
FIG. 13 is a perspective view showing an upper block that is assembled with fastening pins.

FIG. 13 shows another structure for bonding the element plates. Holes 102 between slits are formed in a stamping process of each element plate. The element plates are laminated so that the slits and the holes 102 are properly aligned. A fastening pin 103 having a diameter slightly larger than the hole 102 is forcibly inserted into each hole 102. The laminated element plates are connected together by the fastening pins 102.

Though the upper block 11 is taken as an example in explaining various ways for bonding the element plates, the element plates used in any other blocks or the rotor can be bonded in the same manner. Since the blocks and rotor are fastened by a fastening bolt 24 at their center as shown in FIG. 3, it is advantageous to firmly bond the element plates at their outer periphery with resin, solder, molding, plating, or the like to enhance the efficiency for transferring vibration.

(Second Embodiment)

Figure 14:
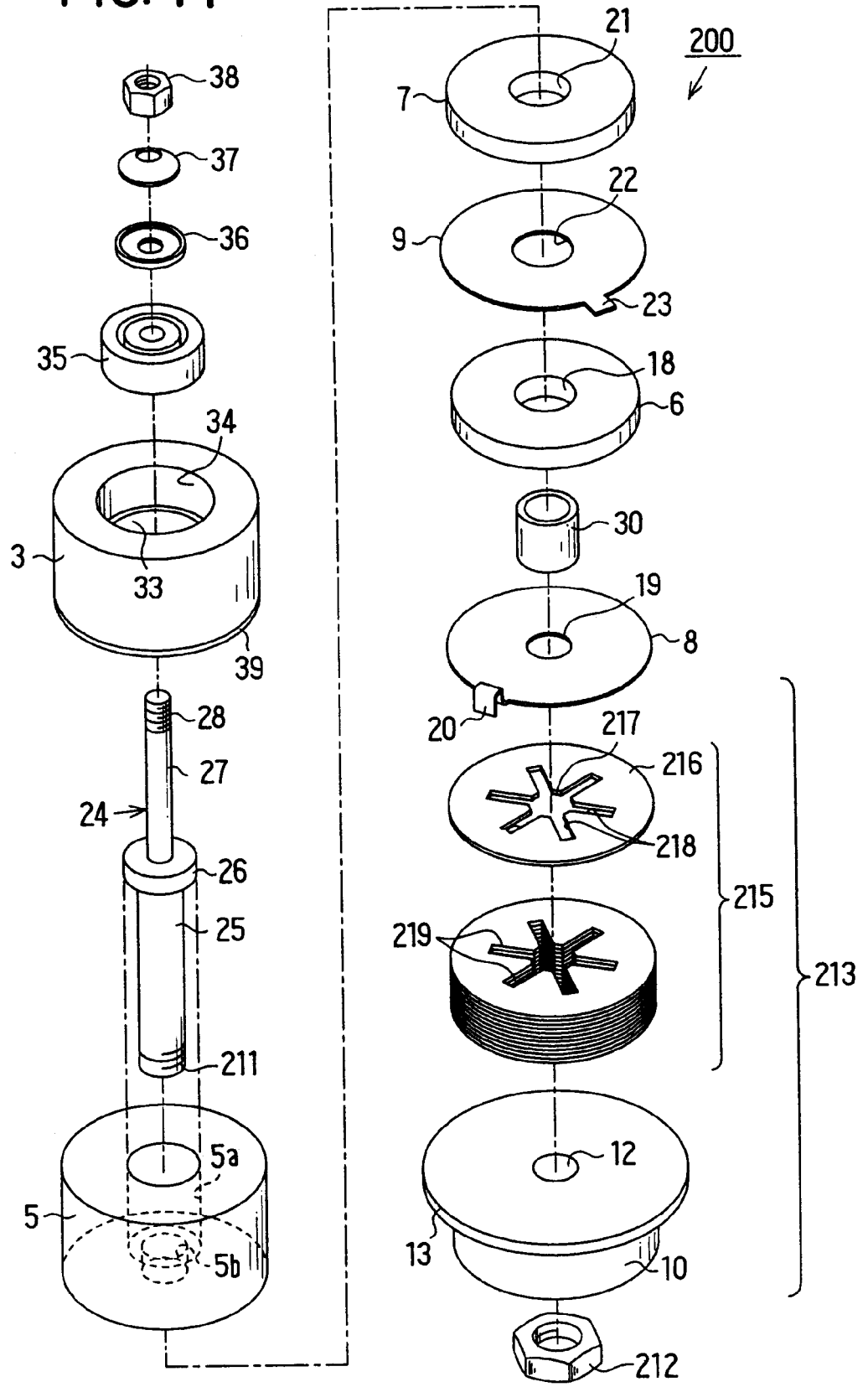
FIG. 14 is an exploded view showing parts and components constituting an ultrasonic motor as a second embodiment of the present invention.
Figure 15:
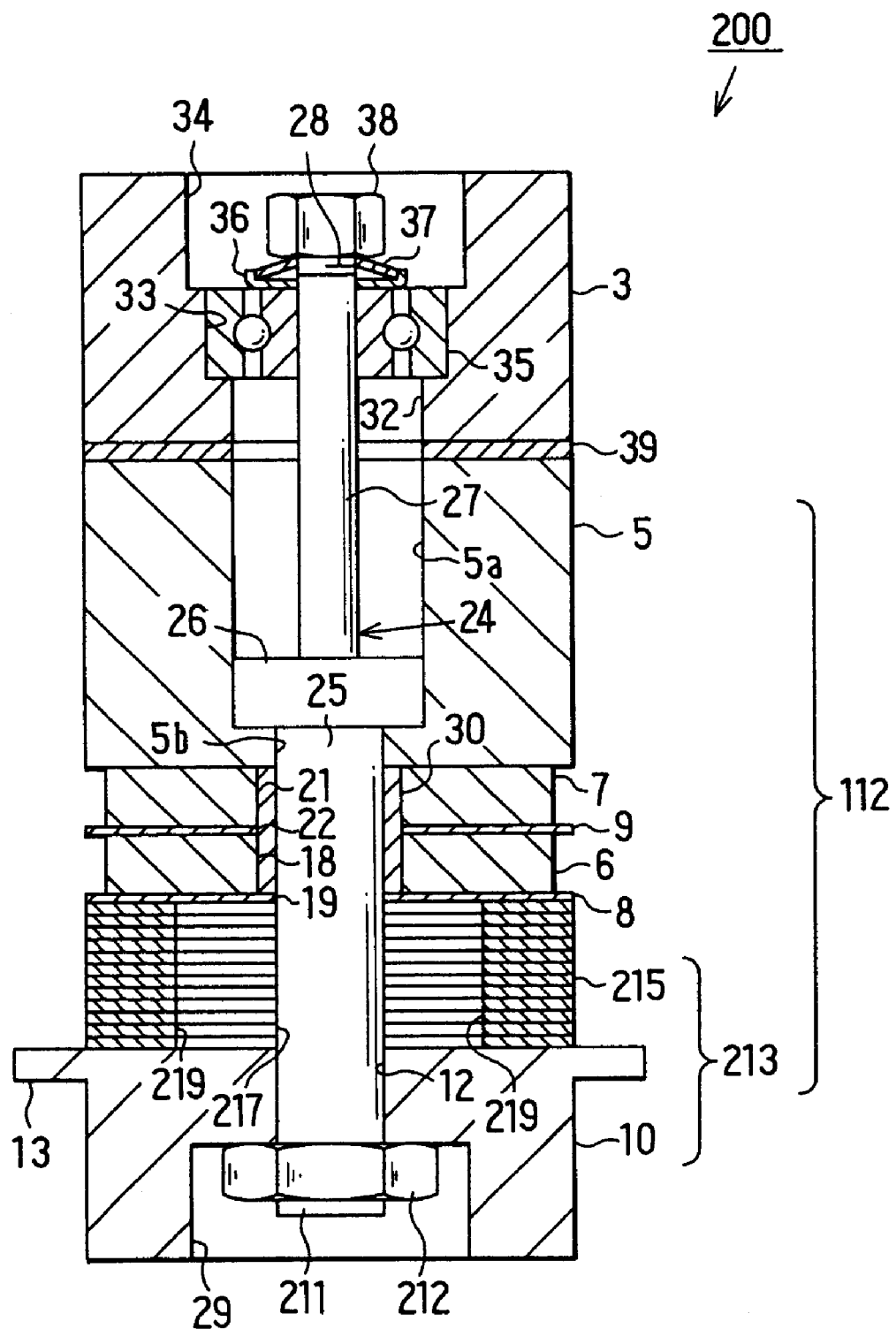
FIG. 15 is a cross-sectional view showing the ultrasonic motor shown in FIG. 14.
Figure 16:
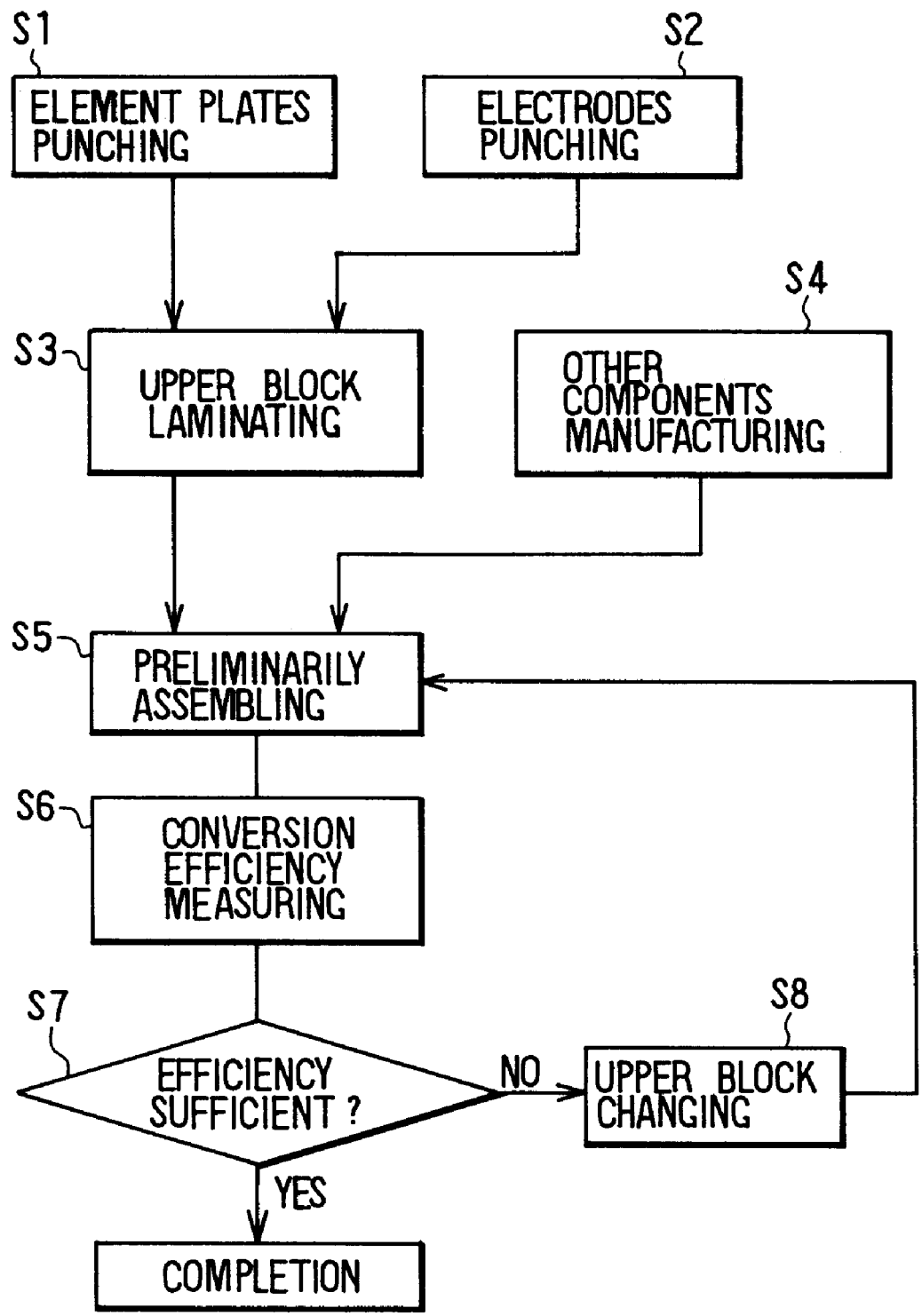
FIG. 16 a chart showing a manufacturing process of the ultrasonic motor shown in FIG. 15.

Referring to FIGS. 14, 15 and 16, a second embodiment of the present invention will be described. FIGS. 14 and 15 show a structure of an ultrasonic motor 200 that is similar to the ultrasonic motor 1 described above as the first embodiment. In the second embodiment, the upper block 11 of the first embodiment is replaced with an upper block 215 and the fastening bolt 24 of the first embodiment is slightly modified to include a male screw 211 at its bottom end to engage with a nut 212. Other parts and components are the same as those of the first embodiment, and therefore they have the same reference numbers.

As shown in FIG. 14, the upper block 215 is formed by laminating a plurality of element plates 216. Each element plate 216 has a center hole 217 and plural cut-out portions 218 formed in a star shape around the center hole 217. Each cut-out portion is open to the center hole 217 and forms a slit 219 when laminated. Six slits are formed in this particular embodiment. The slits 219 convert a part of the longitudinal vibration in the upper block 215 into the twisting vibration in the same manner as in the first embodiment.

FIG. 15 shows a cross-sectional view of the assembled ultrasonic motor 200. The components of the motor are fastened together by the fastening bolt 24 in the similar manner as those of the first embodiment. The bottom end of the fastening bolt 24 is screw-fastened with the nut 212 in place of caulking in the first embodiment. The ultrasonic motor 200 operates in the same manner as the first embodiment.

Referring to FIG. 16, a manufacturing process of the ultrasonic motor 200 will be explained. At step S1, element plates 216 are punched out in press-work. At step S2, a first electrode plate 8 is similarly punched out. At step S3, a plurality of element plates 216 and the first electrode plate 8 are laminated and bonded together, thereby forming the upper block 215. The cut-out portions 218 of each element plate are aligned so that they form the silts 219 in the laminating process. At step S3, several kinds of upper block 215, each having different numbers of laminated element plates 216, are made. At step S4, other components including the lower block 10, the second block 5, the rotor 3, the second electrode plate 9, the first and second piezoelectric elements 6, 7, the fastening bolts 24 and the nut 212 are manufactured. At step S5, all the components are preliminarily assembled into the ultrasonic motor 200 with the fastening bolt 24 and the nut 212.

Then, at step S6, the vibration conversion efficiency of the upper block 215 is measured. The upper block 215 converts a part of the longitudinal vibration generated by the piezoelectric elements 6, 7, and transferred to the upper block 215 into the twisting vibration. At step S7, whether the conversion efficiency satisfies a predetermined level that is able to properly operate the ultrasonic motor 200 is checked. If it is determined at step S7 that the conversion efficiency is not sufficient, then at step S8 the motor is disassembled, and the process returns to step S5. At step 5, the upper block 215 is changed to another upper block 215 that has different numbers of the element plates 216, and the motor is assembled again. The conversion efficiency is checked again at step S6, and thereafter the steps S7, S8, S5 and S6 are repeated. If it is determined that the conversion efficiency is satisfactory at step S7, the manufacturing process is completed.

The ultrasonic motor 200 thus manufactured operates in the similar manner as the motor 1 of the first embodiment. That is, a part of the longitudinal vibration generated by the piezoelectric elements is converted into the twisting vibration in the upper block 215 and transferred to the second block 5. On the upper surface of the second block 5, the longitudinal vibration and the twisting vibration are combined into the elliptic vibration. The rotor 3 is driven by the combined elliptic vibration. In addition to the advantages of the first embodiment, the second embodiment has following merits. Since the first electrode plate 8 is assembled together with the upper block 215, the motor 200 can be more easily assembled. Since the upper block 215 is selected so that a satisfactory conversion efficiency is obtained, the assembled ultrasonic motor 200 always performs a desired performance. Since the slits 219 are open to the center hole 217 of the upper block 215, laminated element plates 216 can be more securely fastened to one another by the fastening bolt 24, and therefore the vibration can be transferred more efficiently.

(Third Embodiment)

Figure 17:
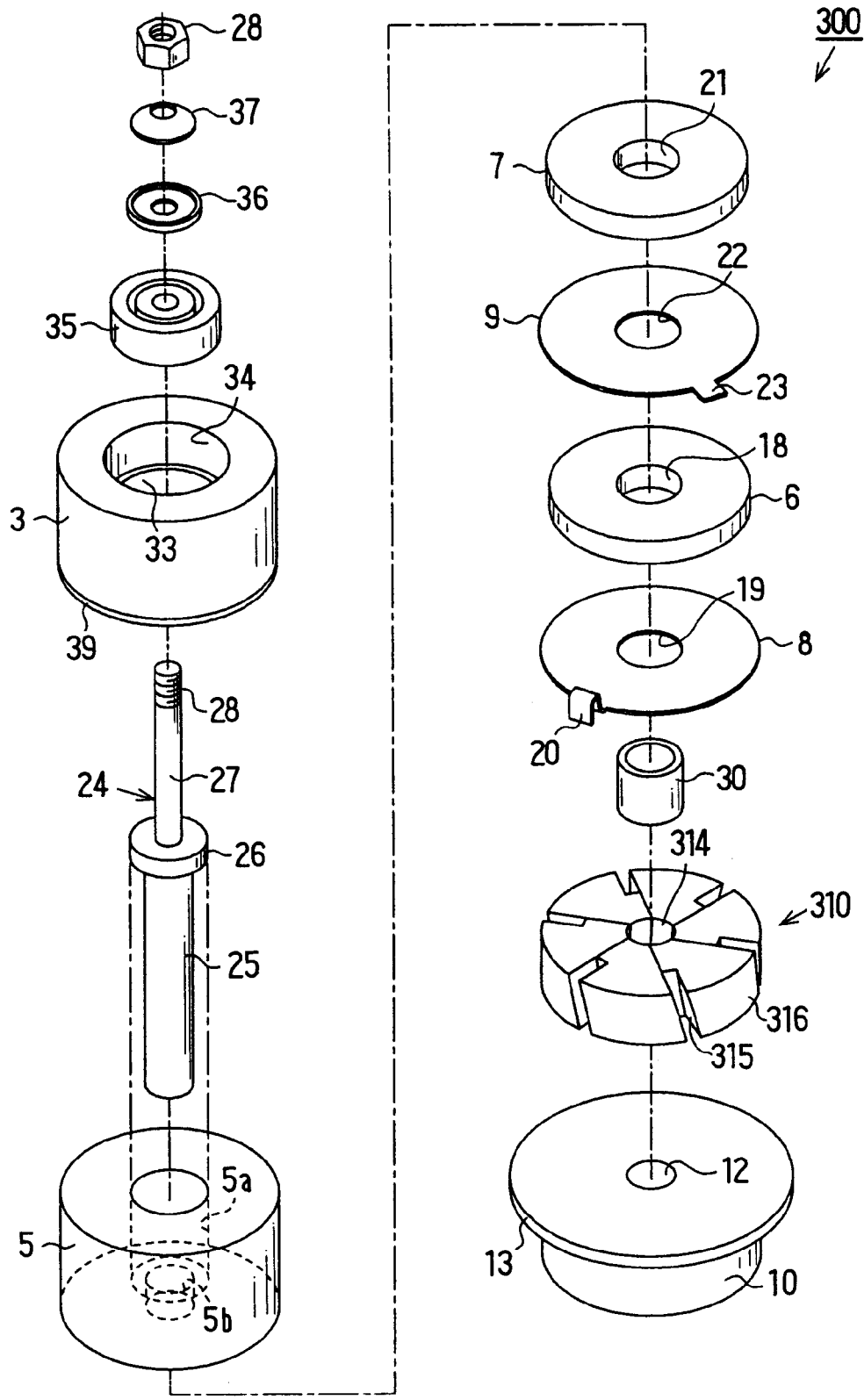
FIG. 17 is an exploded view showing parts and components constituting an ultrasonic motor as a third embodiment of the present invention.

Now, referring to FIGS. 17–26, a third embodiment of the present invention will be described. FIG. 17 shows parts and components constituting an ultrasonic motor 300 as the third embodiment in an exploded fashion. The third embodiment 300 is similar to the first embodiment 1, except that the upper block 11 of the first embodiment is replaced with an upper block 310 that is formed by bonding or connecting plural divided blocks 316. As shown in FIG. 17, plural slits 315 that are open to the outer periphery of the upper block 310 are formed by assembling individual divided blocks 316. A center hole 314 is also formed by assembling the divided blocks 316.

Figure 18:
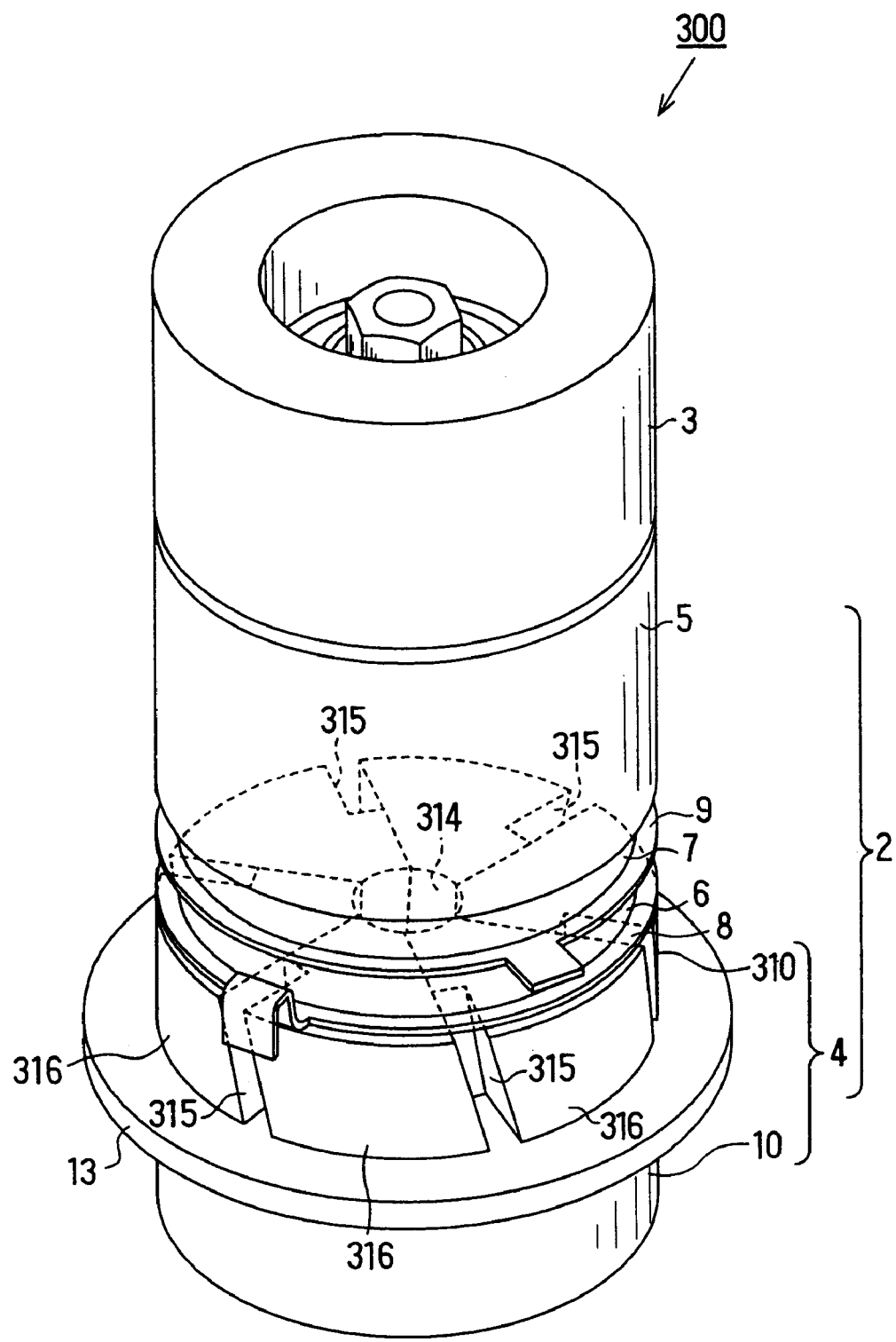
FIG. 18 is a perspective view showing the ultrasonic motor assembled using parts and components shown in FIG. 17.
Figure 19:
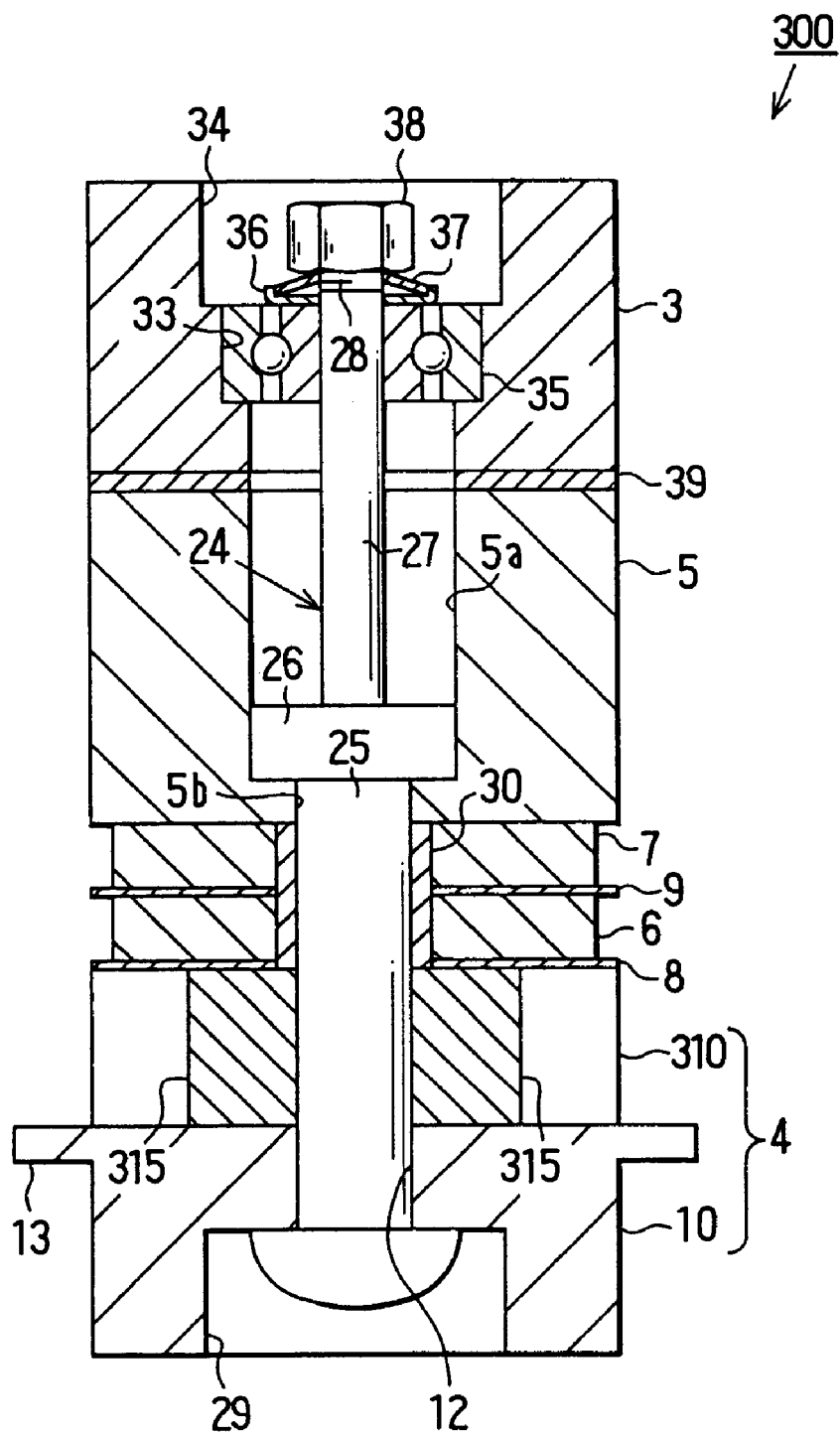
FIG. 19 is a cross-sectional view showing the ultrasonic motor shown in FIG. 18.

FIG. 18 shows a perspective view of the assembled ultrasonic motor 300 in which the upper block 310 having slits 315 is used in place of the upper block 11 used in the first embodiment 1. FIG. 19 shows a cross-sectional view of the ultrasonic motor 300 in which the upper block 310 is assembled.

Figure 20A:
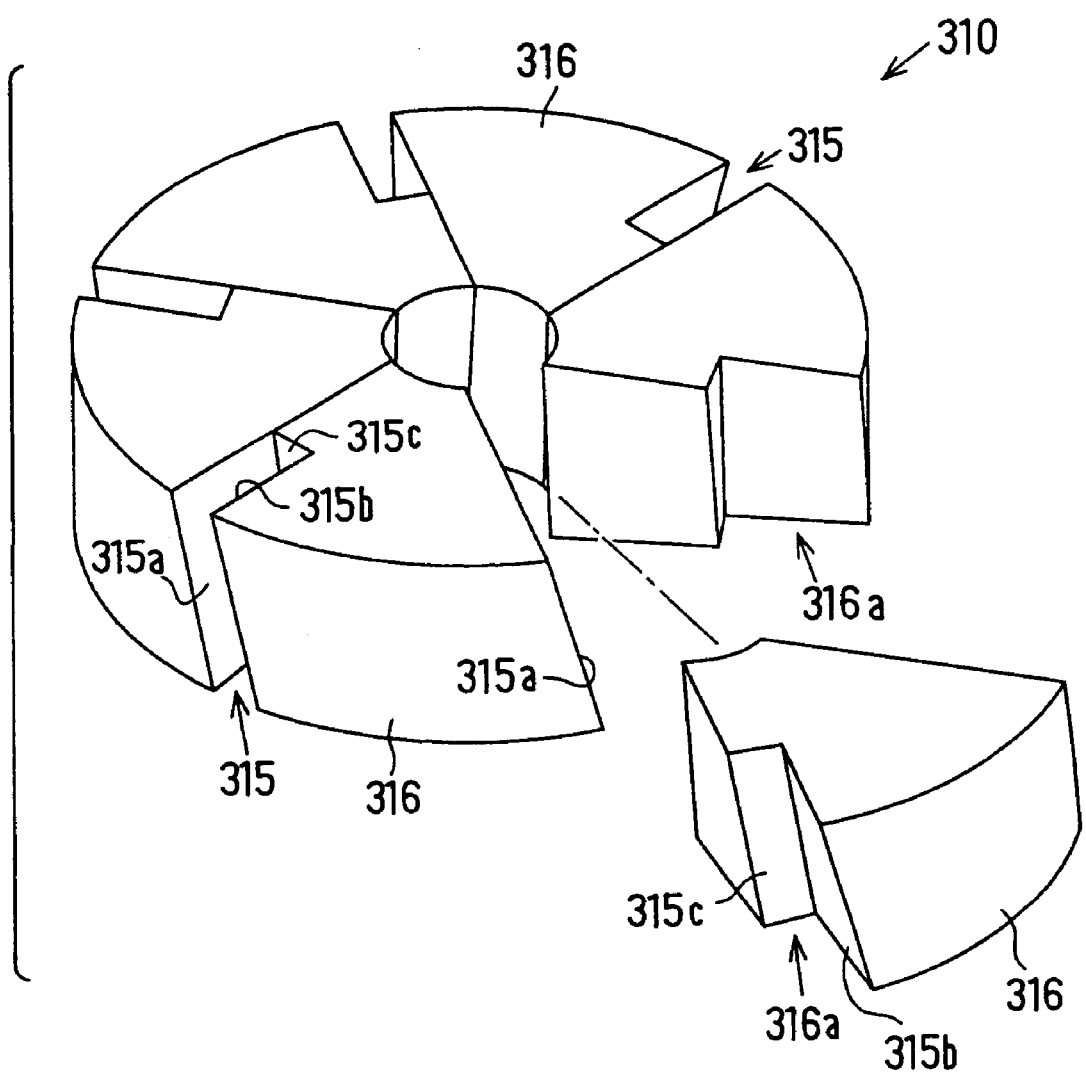
FIGS. 20A–20D are drawings showing an upper block of the ultrasonic motor shown in FIG. 19, the upper block being formed by a plurality of divided blocks.
Figure 20B:
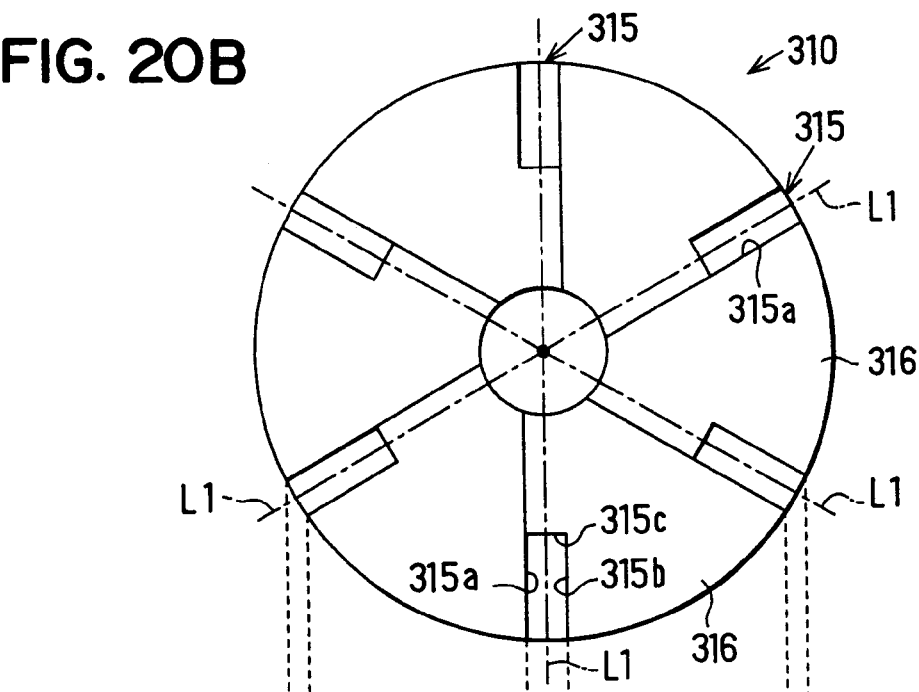
Figure 20C:
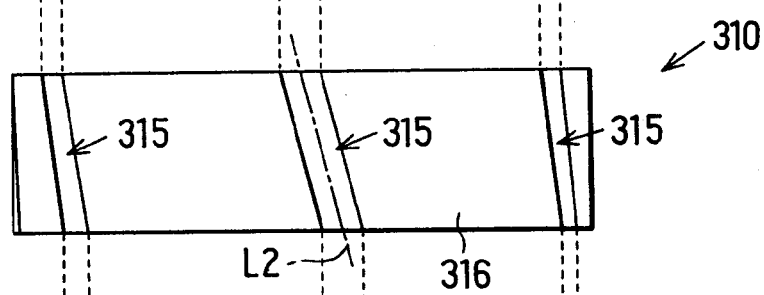
Figure 20D:
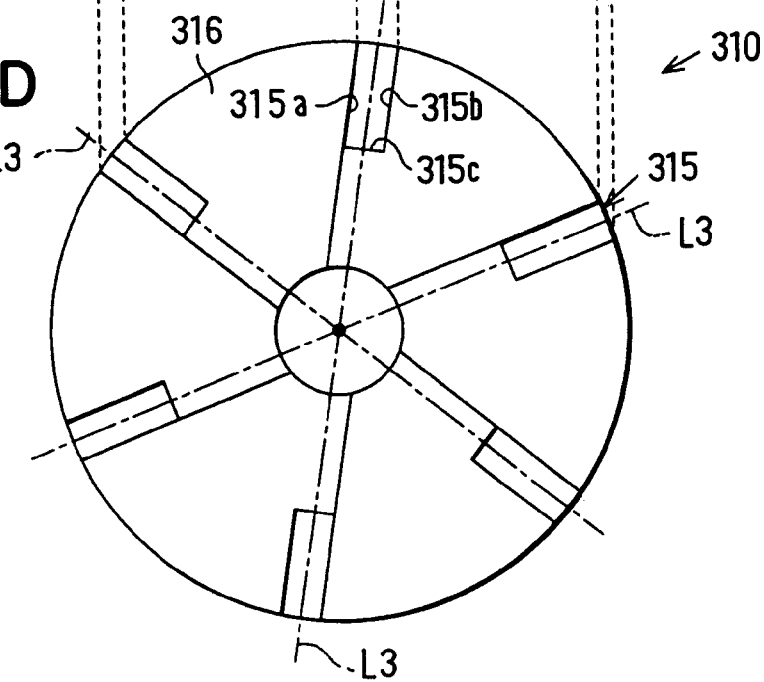

Details of the upper block 310 will be explained with reference to FIGS. 20A–20D. The upper block 310 is substantially disc-shaped, and a center hole 314 extending to the axial direction is formed. The silts 315 that are open to the outer periphery of the upper block 310 are formed with equal intervals therebetween (six silts in this particular embodiment). Each slit 315 is slanted relative to the axis of the upper block 310. As shown in FIG. 20B (top view), each slit 315 extends from the outer periphery toward the center by a predetermined distance, and center line L1 of each slit 315 converges at the center of the upper block 310. As shown in FIG. 20C (side view), each slit 315 extends from the top surface to the bottom surface, and center line L2 is slanted relative to the center axis. As shown in FIG. 20D (bottom view), each slit 315 is formed to extend from the outer periphery toward the center by a predetermined distance, and center line L3 thereof converges at the center of the upper block 310.

The upper block 310 is formed by connecting six divided blocks 316 each having the same shape. The divided block 316 is made of a conductive material such as an aluminum alloy. Each slit 315 is formed by a cut-out portion 316a having surfaces 315b and 315c, and a surface 315a of another divided block. Each divided block 316 is made by sintering an aluminum alloy in this embodiment and connected to one another with adhesive.

Since the upper block 310 is formed by connecting several divided blocks 316 each having an identical shape with the cut-out portions 316a, the slanted slits 315 are automatically formed without machining. Because of the slanted slits 315, the longitudinal vibration is efficiently converted to the twisting vibration, thereby efficiency of the ultrasonic motor 300 being enhanced.

Figure 21A:
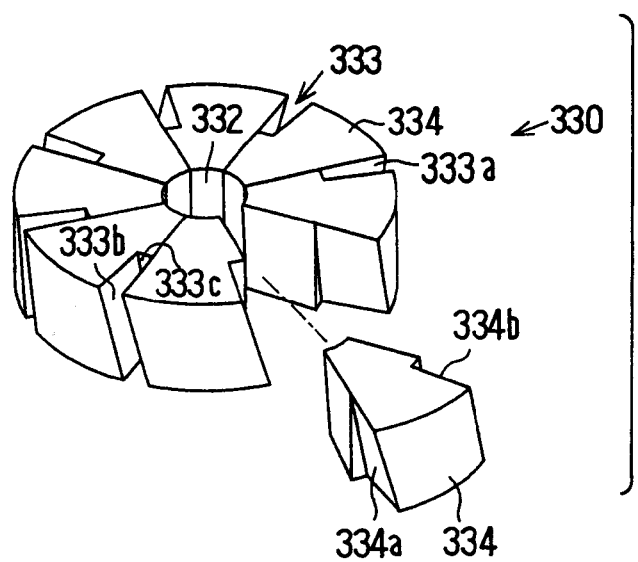
FIGS. 21A–21D are drawings showing a first modification of the upper block shown in FIGS. 20A–20D.
Figure 21B:
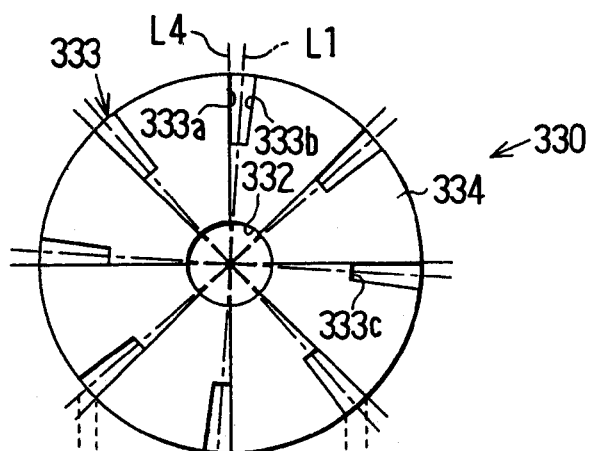
Figure 21C:
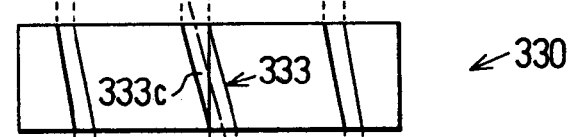
Figure 21D:
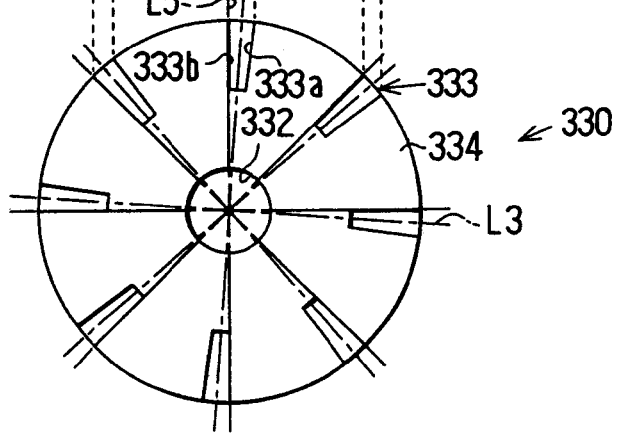

Some examples of modified forms of the upper block 310 are shown in the following drawings, FIGS. 21A–25D. A first modification is shown in FIGS. 21A–21D. An upper block 330 is formed by connecting eight divided blocks 334, each of which is slightly different from the divided block 316 described above. A center hole 332 and slits 333 are similarly formed by assembling the divided blocks 334. Each slit 333 is formed by three surfaces 333a, 333b and 333c of the divided block 334. The horizontal center lines L1 of the slits 333 on the upper surface converge at the center of the upper block 330 as shown in FIG. 21B. The vertical center line L2 of each slit 333 is slanted with respect to the center axis of the upper block 330 as shown in FIG. 21c. The horizontal center lines L3 of the slits 333 on the bottom surface also converge at the center of the upper block 330. The width of each slit 333 viewed from the top and bottom surfaces is gradually narrowed toward the center of the upper block 330. Lines L4 and L5 show dividing lines of each block 334.

Figure 22A:
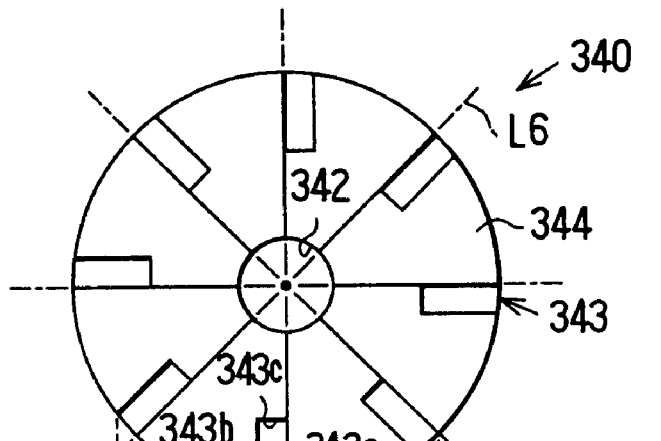
FIGS. 22A–22C are drawings showing a second modification of the upper block.
Figure 22B:
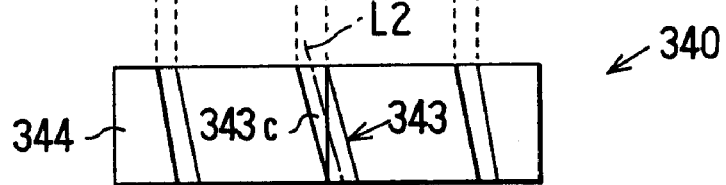
Figure 22C:
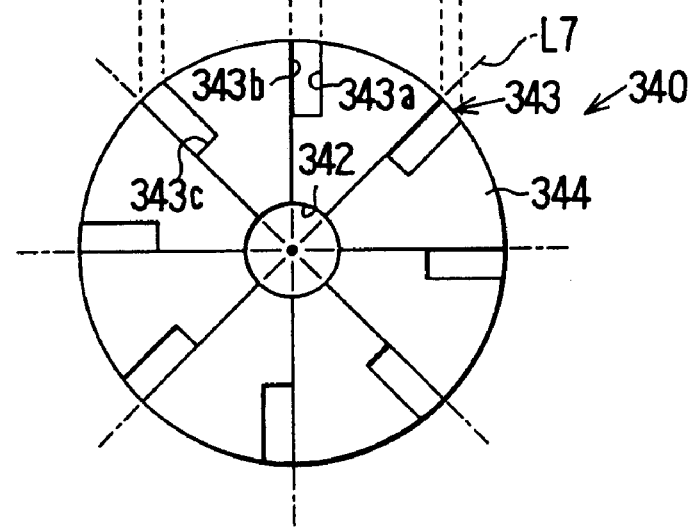

A second modified form of the upper block is shown in FIGS. 22A–22C. An upper block 340 is similar to the upper block 310 described above, except that the center lines of divided blocks 344 do not converge at the center of the upper block 340, but dividing lines L6 and L7 converge at the center. The upper block 340 is formed by connecting eight divided blocks 344, and a center hole 342 and slits 343 are similarly formed. Each slit 343 is formulated by three surfaces 343a, 343b and 343c of each divided block 344.

Figure 23A:
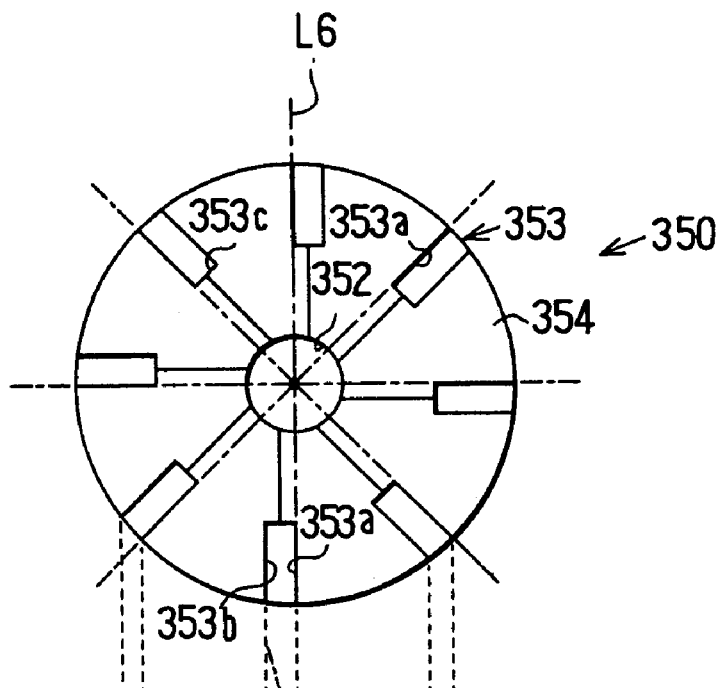
FIGS. 23A–23C are drawings showing a third modification of the upper block.
Figure 23B:
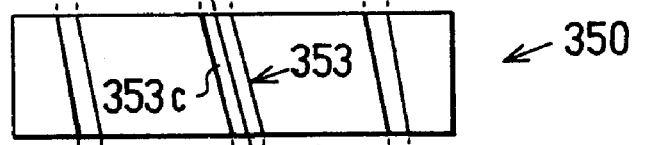
Figure 23C:
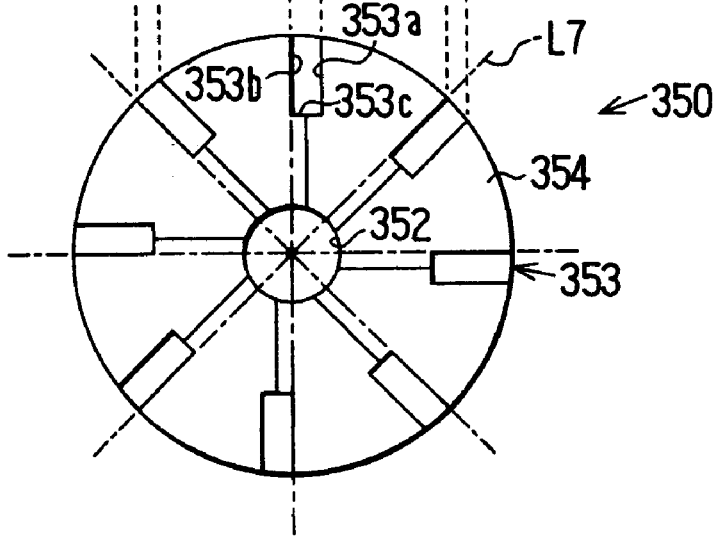

A third modification of the upper block is shown in FIGS. 23A–23C. An upper block 350 is similar to the upper block 340, except that it is divided along center lines of each slit 353. The upper block 350 is formed by connecting eight divided blocks 354, a center hole 352 and eight slits 353 are similarly formed. Each slit 353 is formulated by three surfaces 353a, 353b and 353c of each divided block 354. Line L6 that is an extension of the side surface 353a of each block 354 and line L7 that is an extension of the side surface 353b of each block 354 converge at the center of the upper block 350 respectively.

Figure 24:
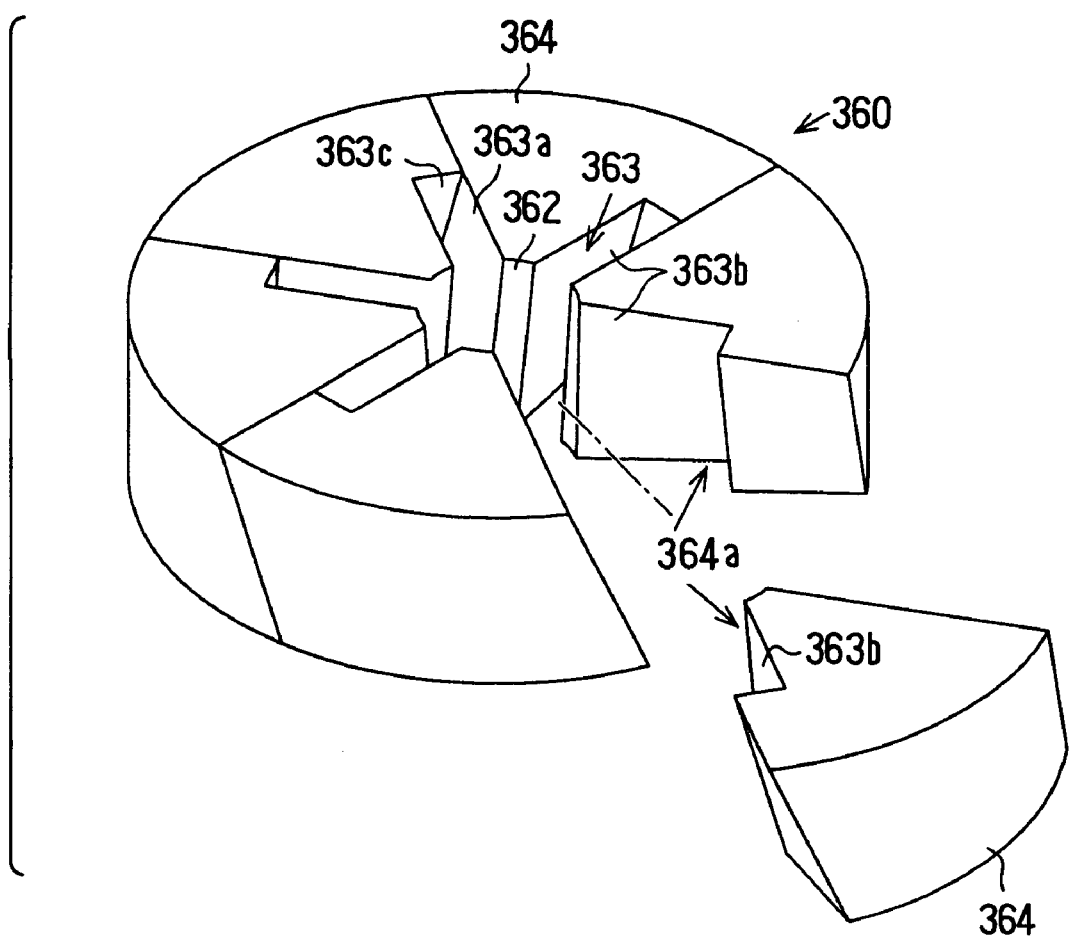
FIG. 24 is a perspective view showing a fourth modification of the upper block.

A fourth modification of the upper block is shown in FIG. 24. An upper block 360 is formed by connecting six divided blocks 364. A center hole 362 is formed similarly in the center, but slits 363 are formed so that they open to the center hole 362, as opposed to the slits in the foregoing examples. Each slit 363, one end of which is open to the center hole 362, includes three surfaces 363a, 363b and 363c of each divided block 364. Since the upper block 360 is fastened to other components by the fastening bolt 24 through its center hole 362, the slits 363 are more securely fastened at their open ends. Accordingly, the vibration is efficiently transferred around the slits 363.

Figure 25A:
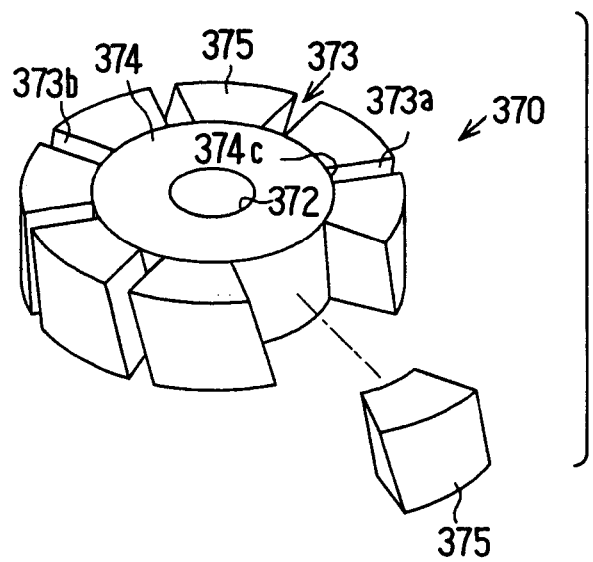
FIGS. 25A–25D are drawings showing a fifth modification of the upper block.
Figure 25B:
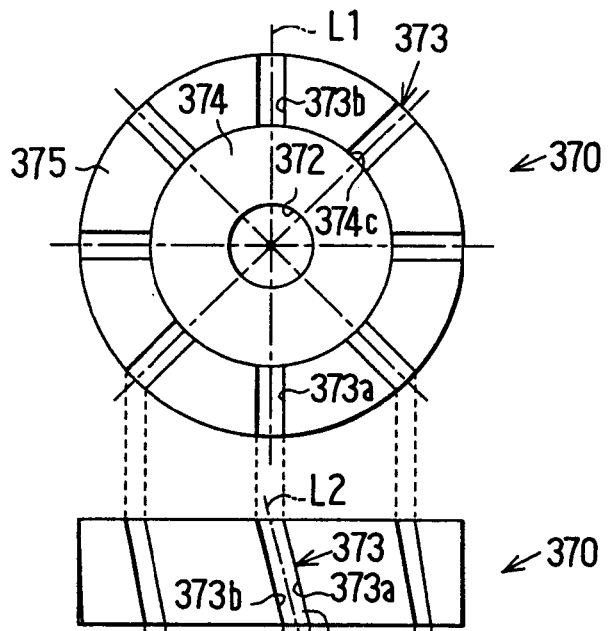
Figure 25C:
Figure 25D:
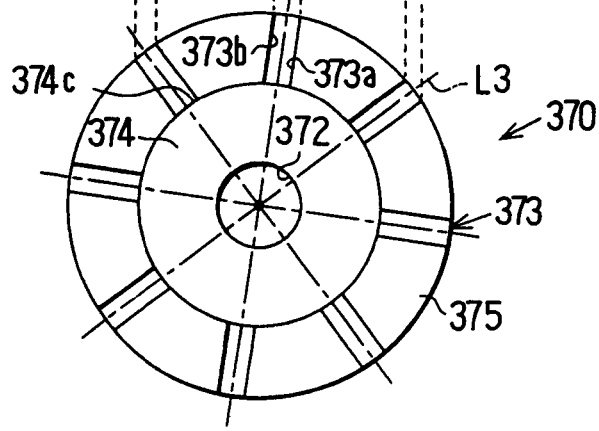

A fifth modification of the upper block is shown in FIGS. 25A–25D. An upper block 370 is composed of a cylindrical center block 374 having a center hole 372 and eight divided blocks 375, each being bonded to the center block 374. Each slit 373 is formed between the neighboring two divided blocks 375 with equal intervals. Each slit 373 is formed by two side surfaces 373a, 373b of the divided block 375 and an outer surface 374c of the center block 374. Both side surfaces 373a and 373b are substantially parallel to each other. Center lines L1 of each slit 373 viewed from the top converge at the center of the upper block 370, as shown in FIG. 25B. Center lines L2 of each slit 373 viewed from the side are slanted with respect to the axis of the upper block 370, as shown in FIG. 25C. Center lines L3 of each slit 373 viewed from the bottom converge at the center of the upper block 370, as shown in FIG. 25D.

Figure 26:
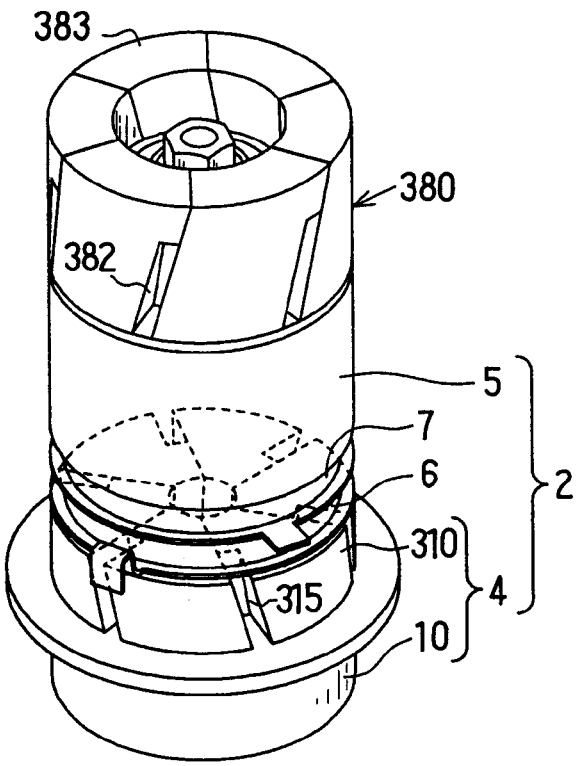
FIG. 26 is a perspective view showing an ultrasonic motor that has a rotor formed by divided blocks.

Though the upper block is formed by the divided blocks in the foregoing examples, the rotor may be made by the divided blocks. Also, both of the rotor and stator may be made by connecting the divided blocks. FIG. 26 shows an example of an ultrasonic motor in which both of the upper block 310 and a rotor 380 are formed by connecting divided blocks. The rotor 380 is composed of six divided blocks 383, and slanted slits 382 for converting the longitudinal vibration to the twisting vibration are formed on the outer periphery of the rotor 380. The upper block 310 is the same one shown in FIG. 20A. Since the slits are formed on both the rotor and stator in this example, the vibration conversion efficiency is enhanced.

The various examples of the upper block and the rotor formed by assembling several divided blocks may be further modified. For example, the slits may not be necessarily slanted, but they may be made in parallel to the axis. The divided blocks may be assembled together in various ways, such as soldering, bonding with adhesive, mechanical fastening or the like. The divided blocks may be made by forging, die-casting, sintering, or the like. The material of the divided blocks is not limited to an aluminum alloy, but it may be made of iron, copper or other conductive materials. Though the longitudinal vibration is generated by operation of the piezoelectric elements in the foregoing embodiments, and a part of the longitudinal vibration is converted into the twisting vibration, it is also possible to generate twisting vibration in the stator and convert it to the longitudinal vibration.

(Fourth Embodiment)

Figure 27:
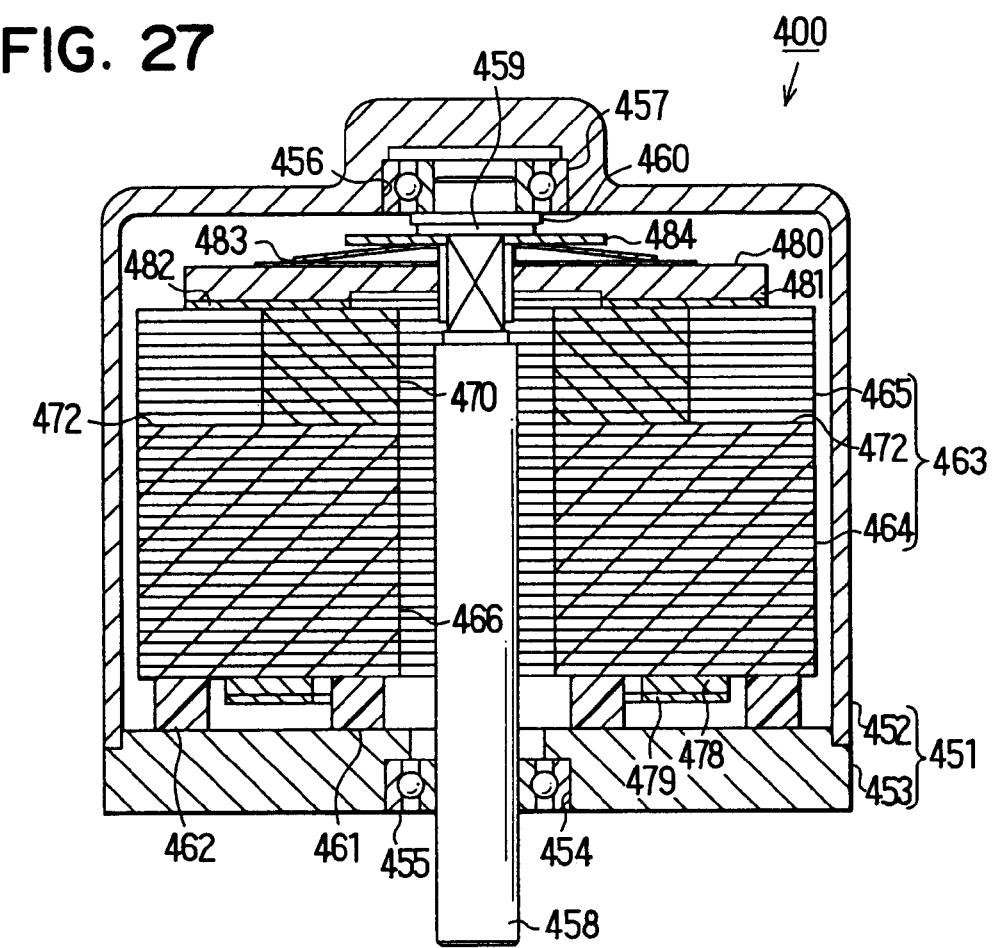
FIG. 27 is a cross-sectional view showing an ultrasonic motor as a fourth embodiment of the present invention.

A fourth embodiment of the present invention will be described, referring to FIGS. 27 and 28. FIG. 27 shows a cross-sectional view of an ultrasonic motor 400 as a fourth embodiment of the present invention. A stator 463, a rotor 480 and other components of the motor are all contained in a casing 451 having a cylindrical case 452 and a disk-like end plate 453. The stator 463 consisting of a lower block 464 and an upper block 465 is supported on the end plate 453 via rubber cushion rings 461 and 462. On the upper surface of the stator 463, a rotor 480 having a lining 482 bonded to the lower surface 481 of the rotor 480 is slidably disposed. A rotating shaft 458 loosely inserted into the through-holes of the stator 463 is fixedly connected to the rotor 480 and rotatably supported by both bearings 455 and 457.

The lower bearing 455 is supported in a bearing hole 454 formed in the end plate 453. The upper bearing 457 is supported in a bearing space 456 formed in the case 452. The rotating shaft 458 has a flange 459 formed at a vicinity of its upper end. A washer 460 is disposed between the flange 459 and the bearing 456. Underneath the flange 459, a disc-shaped spring stopper 484 is disposed, and a disc-shaped spring 483 is resiliently disposed between the spring stopper 484 and the rotor 480. A ring-shaped piezoelectric element 478 is fixed to the bottom surface of the stator 463 and disposed between the two rubber cushion rings 461 and 462. Underneath the piezoelectric element 478, an electrode ring 479 is bonded to the piezoelectric element 478. The piezoelectric element 478 is polarized so that it generates longitudinal vibration in the axial direction when energized with high frequency voltage.

Figure 28:
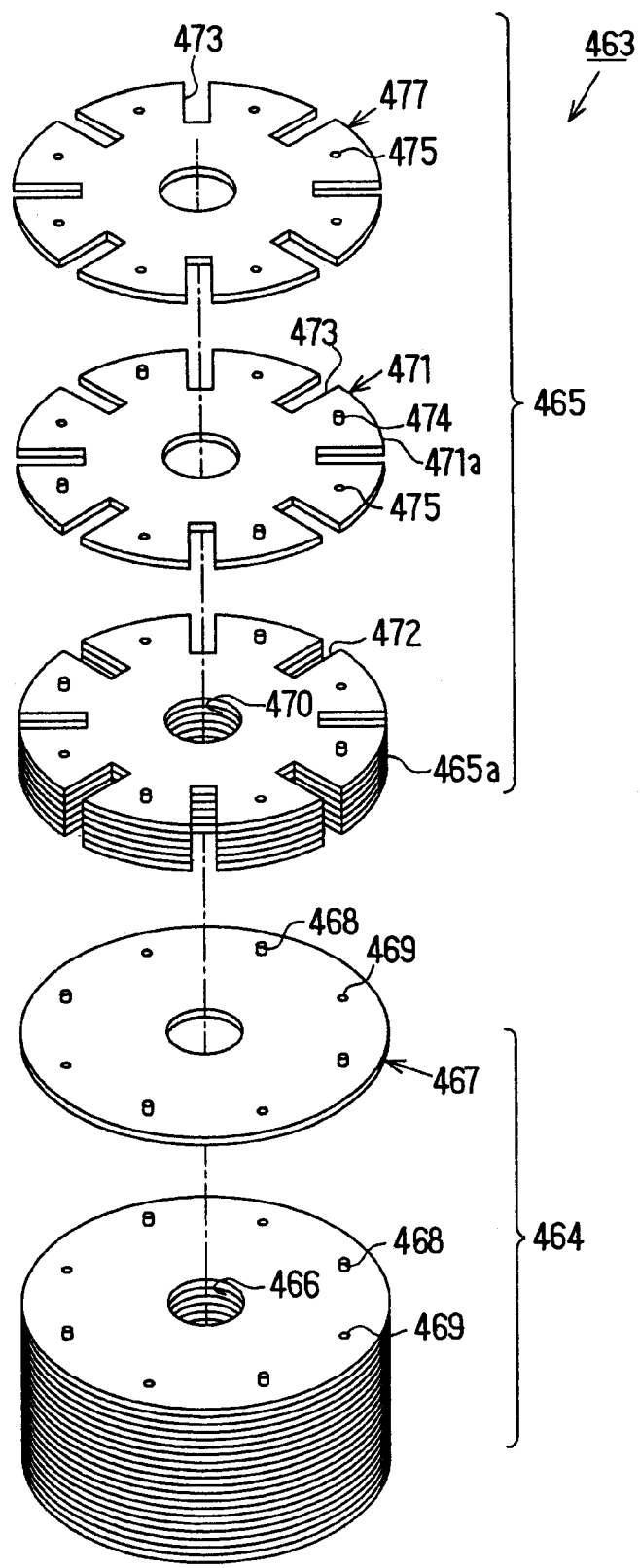
FIG. 28 is an exploded view showing parts constituting a stator used in the ultrasonic motor shown in FIG. 27.
Figure 29:
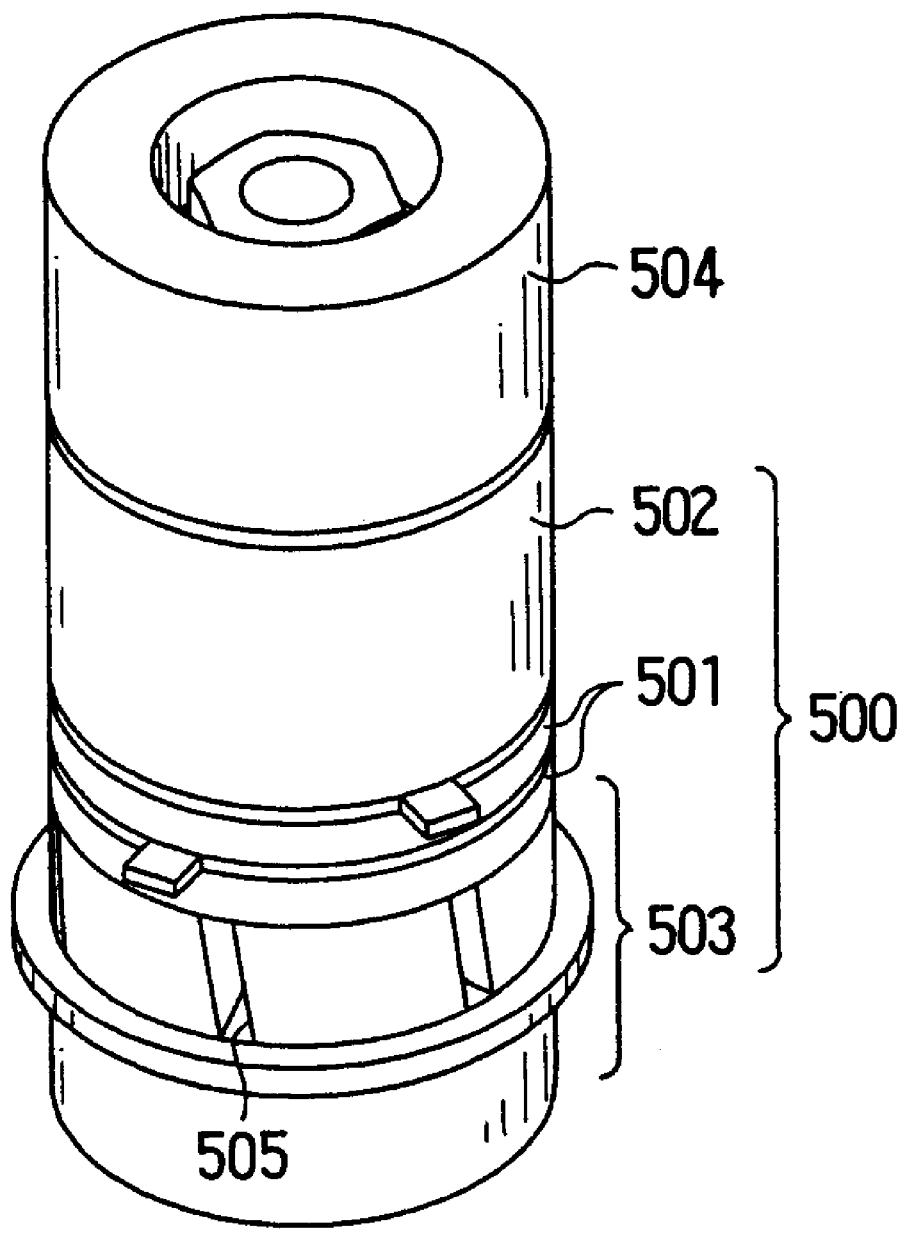
FIG. 29 is a perspective view showing a conventional ultrasonic motor.

Details of the stator 463 are shown in FIG. 28 in a exploded fashion. The stator 463 is substantially cylinder-shaped and composed of a lower block 464 and an upper block 465. The lower block 464 is formed by laminating plural element plates 467 made of a conductive material by stamping. Four projections 468 and four holes 469 are alternately made on the element plate 467 with equal intervals therebetween. The projections 468 and holes 469 are complementary with each other, so that each projection 468 is press-fitted into each hole 469 when the element plates 467 are laminated on one another. Thus, the element plates 467 are all connected, forming a solid lower block 464. The lower block has a through-hole 466 to accommodate therein the rotating shaft 458.

The upper block 465 is formed by laminating plural element plates 471 and one top plate 477. The element plate 471 is made of a conductive material by stamping. Eight cut-out portions 473 which are open to the outer periphery 471a are fromed on the element plate 471 with equal intervals therebetween, and projections 474 and four holes 4 are alternately formed between the cut-out portions 473. Each projection 474 is press-fitted into each hole 475 when the element plates 471 are laminated on one another, thereby forming a solid upper block 465. The top plate 477 is shaped similarly to the element plate 471, but projections are replaced with holes 475. The top plate 477 is laminated on the top of the upper block 465 by press-fitting the projections 474 into holes 475 of the top plate 477. When all the element plates 471 and the top plate 477 are laminated, the upper block 465 is completed. The upper block 465 has eight slits 472 which are open to the outer periphery 465a and a through-hole 470. The slits 472 function to convert a part of the longitudinal vibration in the upper block 465 into the twisting vibration. The through-hole 470 loosely accommodates therein the rotating shaft 458.

The upper block 465 is connected to the lower block 464 by press-fitting the projections 468 of the upper most element plate 467 of the lower block 464 into the holes 475 of the lower most element plate 471 of the upper block 465. The top surface of the completed stator 463 is smooth because the top plate 477 has no projections. Accordingly, the rotor 481 is able to slidably contact the top surface of the stator 463.

The ultrasonic motor 400 described above operates in the similar manner as other embodiments. Upon energization of the piezoelectric element 478 by imposing high frequency voltage thereon, the longitudinal vibration is generated in the stator 463. A part of the longitudinal vibration in the upper bolck 465 is converted into the twisting vibration by operation of the slits 472. On the upper surface of the stator 463, the elliptic vibration that is a compound of the longitudinal and twisting vibrations appears. The rotor 480 is driven by the elliptic vibration, and its rotational torque is taken out form the rotating shaft 458.

Since the slits 472 of the upper block 465 are formed by laminating plural element plates 471 having cut-out portions 473, the slits are automatically formed without being machined. Since all the components of the ultrasonic motor are contained in the casing 451, the structure of the ultrasonic motor 400 is simple and compact. Since the rotating shaft 458 is connected to the rotor 480 contained in the casing 451 and extended outside of the casing, driving torque of the rotor 480 is easily taken out. Since element plates 467, 471 constituting the stator 463 are connected to one another by press-fitting the projections 468, 474 into complementary holes 469, 475, no adhesive or any other bonding means is necessary to connect the element plates into one piece.

Though the piezoelectric elements assembled in the stator generate longitudinal vibration in all of the embodiments described above, it is also possible to design the piezoelectric elements to generate twisting vibration and to convert a part thereof into logitudinal vibration by operation of slits formed on the stator or the rotor.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An ultrasonic motor comprising:

a vibration generating member having a piezoelectric member that generates a first mode ultrasonic vibration in the vibration generating member;

a vibration converting member that converts a part of the first mode ultrasonic vibration transferred from the vibration generating member into a second mode ultrasonic vibration by operation of slits formed on the vibration converting member; and a rotor slidably rotatable on the vibration generating member, the rotor being driven by elliptic vibration that is a compound vibration of the first and second mode ultrasonic vibrations, wherein:

the vibration converting member is substantially in a shape of a cylinder having an outer periphery and a center hole and is formed by laminating a plurality of element plates each having cut-out portions; and the cut-out portions of each element plate form the slits when the plurality of element plates are laminated.

2. The ultrasonic motor as in claim 1, wherein:

the slits are open to the outer periphery of the vibration converting member.

3. The ultrasonic motor as in claim 1, wherein:

the slits are open to the inner hole of the vibration converting member.

4. The ultrasonic motor as in claim 1, wherein:

the vibration generating member includes a first block and a second block; and the piezoelectric member is sandwiched between the first and the second blocks.

5. The ultrasonic motor as in claim 1, wherein:

the vibration converting member is integrally formed with the vibration generating member.

6. The ultrasonic motor as in claim 4, wherein:

the piezoelectric member is sandwiched between a pair of electrode plates.

7. The ultrasonic motor as in claim 1, wherein:

the vibration converting member is integrally formed with the rotor.

8. The ultrasonic motor as in claim 7, wherein:

the vibration converting member integrally formed with the rotor is made by laminating a plurality of element plates; and a part of the plurality of element plates includes a coupling hole to connect an output shaft thereto.

9. The ultrasonic motor as in claim 5, wherein:

the element plates are connected to one another by press-fitting projections into complementary holes, both formed on each element plate.

10. The ultrasonic motor as in claim 9, wherein:

each element plate is removable from and able to be additionally laminated on the laminated vibration converting member to adjust efficiency of converting the first mode ultrasonic vibration to the second mode ultrasonic vibration.

11. The ultrasonic motor as in claim 1, wherein:

the vibration generating member, the vibration converting member and the rotor is contained in a casing; and an output shaft that extends to outside of the casing is connected to the rotor.

12. A stator for use in an ultrasonic motor that includes a rotor driven by elliptic vibration formed in the stator, the stator comprising:

a vibration generating member having a piezoelectric member that generates a first mode ultrasonic vibration in the vibration generating member; and a vibration converting member, connected to the vibration generating member, that converts a part of the first mode ultrasonic vibration transferred from the vibration generating member into a second mode ultrasonic vibration by operation of slits formed on the vibration converting member, wherein:

the first and second mode ultrasonic vibrations are compound into the elliptic vibration in the stator;

the vibration converting member is substantially in a shape of a cylinder having an outer periphery and a center hole and is formed by laminating a plurality of element plates each having cut-out portions; and the cut-out portions of each element plate form the slits when the plurality of element plates are laminated.

13. The stator as in claim 12, wherein:

the slits are open to the outer periphery of the vibration converting member.

14. The stator as in claim 12, wherein:

the slits are open to the center hole of the vibration converting member.

15. A rotor for use in an ultrasonic motor that includes a stator in which a first mode ultrasonic vibration is generated, the rotor comprising:

a vibration converting member that converts a part of the first mode ultrasonic vibration into a second mode ultrasonic vibration and combines the first and second mode ultrasonic vibrations into elliptic vibration to drive the rotor by operation of slits formed on the rotor, wherein:

the vibration converting member is substantially in a shape of a cylinder having an outer periphery and a center hole and is formed by laminating a plurality of element plates each having cut-out portions; and the cut-out portions of each element plate form the slits when the plurality of element plates are laminated.

16. The rotor as in claim 15, wherein:

the slits are open to the outer periphery of the vibration converting member.

17. The rotor as in claim 15, wherein:

the slits are open to the center hole of the vibration converting member.

18. An ultrasonic motor comprising:

a vibration generating member having a piezoelectric member that generates a first mode ultrasonic vibration in the vibration generating member;

a vibration converting member that converts a part of the first mode ultrasonic vibration transferred from the vibration generating member into a second mode ultrasonic vibration by operation of slits formed on the vibration converting member; and a rotor slidably rotatable on the vibration generating member, the rotor being driven by elliptic vibration that is a compound vibration of the first and second mode ultrasonic vibrations, wherein:

the vibration converting member is substantially in a shape of a cylinder having an outer periphery and is formed by laminating a plurality of disc-shaped element plates each having cut-out portions that open to the outer periphery of the element plates;

the cut-out portions of each element plate form the slits that open to the outer periphery of the vibration converting member when the plurality of the element plates are laminated; and the plurality of element plates laminated are all bonded together by bonding means.

19. The ultrasonic motor as in claim 18, wherein:

the bonding means is adhesive attached to the outer periphery of the vibration converting member.

20. The ultrasonic motor as in claim 18, wherein:

the bonding means is solder connecting the outer periphery of the vibration converting member.

21. The ultrasonic motor as in claim 18, wherein:

the bonding means is caulking connecting the outer periphery of the vibration converting member.

22. The ultrasonic motor as in claim 18, wherein:

the bonding means is a holding case that contains the vibration converting member therein.

23. The ultrasonic motor as in claim 18, wherein:

the bonding means is a covering that covers a whole outer surface of the vibration converting member, the covering being made in a process selected from a group consisting of resin molding and metal plating.

24. The ultrasonic motor as in claim 18, wherein:

the bonding means is a plurality of pins inserted into the laminated vibration converting member.

25. An ultrasonic motor comprising:

a cylindrical stator having a first block, a second block and a piezoelectric member for generating longitudinal vibration in the stator upon energization by high frequency voltage, the piezoelectric member being sandwiched between the first and second blocks; and a cylindrical rotor coaxially disposed on the stator, the rotor being slidably rotatable on the stator, wherein:

the first block includes a vibration converting member having slits formed thereon for converting a part of the longitudinal vibration into twisting vibration, both of the longitudinal and twisting vibrations being compounded in the stator to form elliptic vibration by which the rotor is driven;

the vibration converting member is formed by laminating a plurality of element plates, each element plate having cut-out portions open to the outer periphery of the element plate; and the slits are formed by the cut-out portions of element plates when the element plates are laminated.

26. The ultrasonic motor as in claim 25, wherein:

the plurality of element plates are connected together to form the vibration converting member by bonding the outer periphery thereof with a bonding material.

* * * * *